US010726086B2

(12) United States Patent
Longbin et al.

(10) Patent No.: US 10,726,086 B2
(45) Date of Patent: Jul. 28, 2020

(54) AESTHETIC SEARCH ENGINE

(71) Applicant: Houzz, Inc., Palo Alto, CA (US)

(72) Inventors: Chen Longbin, Palo Alto, CA (US); Le Kang, Palo Alto, CA (US); Lei Yao, Palo Alto, CA (US); Zhenyu Mao, Palo Alto, CA (US)

(73) Assignee: Houzz, Inc., Palo Alto, CA (US)

( * ) Notice: Subject to any disclaimer, the term of this patent is extended or adjusted under 35 U.S.C. 154(b) by 448 days.

(21) Appl. No.: 15/351,978

(22) Filed: Nov. 15, 2016

(65) Prior Publication Data

US 2018/0137201 A1    May 17, 2018

(51) Int. Cl.
*G06F 16/95*    (2019.01)
*G06F 16/9535*    (2019.01)
*G06F 16/51*    (2019.01)
*G06F 16/248*    (2019.01)
*G06F 16/28*    (2019.01)
*G06F 16/58*    (2019.01)
*G06F 16/2457*    (2019.01)
*G06K 9/00*    (2006.01)
*G06K 9/46*    (2006.01)
*G06F 16/583*    (2019.01)
*G06F 16/50*    (2019.01)
*G06F 16/40*    (2019.01)

(52) U.S. Cl.
CPC ........ *G06F 16/9535* (2019.01); *G06F 16/248* (2019.01); *G06F 16/24578* (2019.01); *G06F 16/285* (2019.01); *G06F 16/40* (2019.01); *G06F 16/50* (2019.01); *G06F 16/51* (2019.01); *G06F 16/583* (2019.01); *G06F 16/5854* (2019.01); *G06F 16/5866* (2019.01); *G06K 9/00624* (2013.01); *G06K 9/00711* (2013.01); *G06K 9/00718* (2013.01); *G06K 9/00744* (2013.01); *G06K 9/4628* (2013.01)

(58) Field of Classification Search
CPC .................................................... G06F 16/9535
USPC .......................................................... 707/713
See application file for complete search history.

(56) References Cited

U.S. PATENT DOCUMENTS

2008/0268876 A1* 10/2008 Gelfand ................. G06Q 30/02
                                                                                455/457
2013/0145292 A1*  6/2013 Cohen .................... G06Q 10/00
                                                                                715/760
2016/0267637 A1*  9/2016 Hsiao ................. G06F 16/24578

FOREIGN PATENT DOCUMENTS

JP        2018081692 A    5/2018
WO    WO-2012031928 A1   3/2012

OTHER PUBLICATIONS

"European Application Serial No. 17201835.0, Extended European Search Report dated Apr. 11, 2018", 9 pgs.

(Continued)

*Primary Examiner* — Syling Yen
(74) *Attorney, Agent, or Firm* — Schwegman Lundberg & Woessner, P.A.

(57) ABSTRACT

An improved approach for returning aesthetically relevant search results is disclosed. A training set of images (e.g., designer-created images) is used to train a detection engine that detects items in the images as features. A classification engine is configured to analyze the features and generate classification indices for the features. A user can select an item, and the classification index for the feature corresponding to the item is retrieved. The classification index is used to identify result images, which can be returned ranked according user action data and other parameters, such as style.

20 Claims, 19 Drawing Sheets

(56) References Cited

OTHER PUBLICATIONS

"European Application Serial No. 17201835.0, Response filed Nov. 16, 2018 to Extended European Search Report dated Apr. 11, 2018", 27 pgs.

* cited by examiner

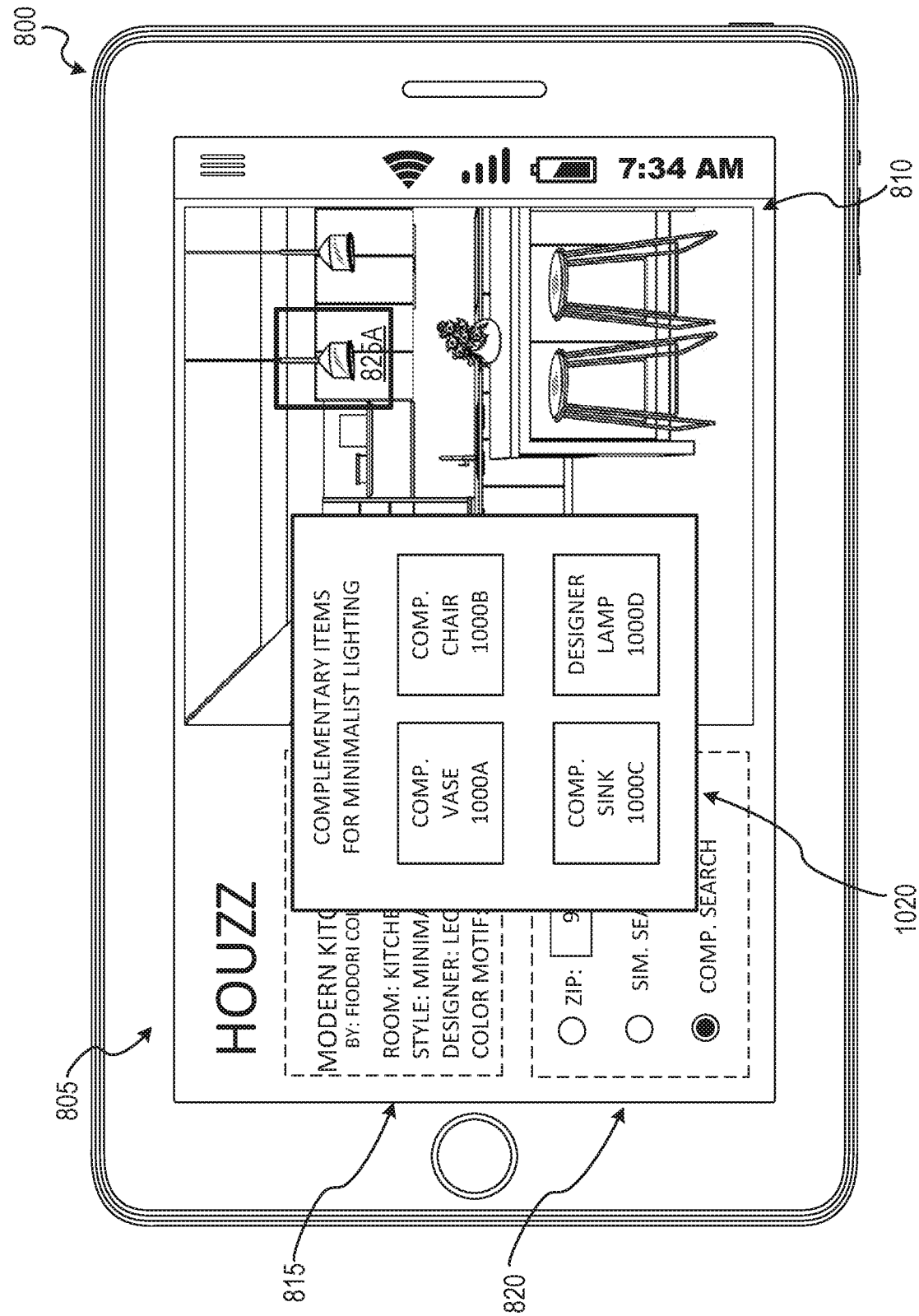

AESTHETIC SEARCH ENGINE

TECHNICAL FIELD

Embodiments of the present disclosure relate generally to search engines and particularly, but not by way of limitation, to an aesthetic search engine.

BACKGROUND

In recent years, users have increasingly used image-based search sites to find items (e.g., couches, pillows, sinks, tables, clothes) which they are interested. However, images of the items are a poor substitute for the users, since they cannot inspect the items in real life (e.g., in a showroom). Thus, the users are forced to make decisions based only on the provided images and description data. Further, some users, such as clothing designers or interior designers, seek to create arrangements of items that aesthetically function together. For example, a clothing designer may select shoes, pants, a shirt, a watch, and a hat to create a stylish outfit, or an interior designer may select a couch, chair, table, vase, and floor lamp to create a living room design. While it is difficult to judge individual items using only images, it is far more complex to create an aesthetically pleasing arrangement of items using images because the user cannot examine how the items look next to one another.

BRIEF DESCRIPTION OF THE DRAWINGS

Various ones of the appended drawings merely illustrate example embodiments of the present disclosure and should not be considered as limiting its scope.

FIGS. 10A and 10B illustrate example user interfaces for returning complementary item search results using the aesthetic search system, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, an aesthetic search system can generate search results based on analysis of images displaying arrangements of items. The images may be designer photos (e.g., interior design images, clothing fashion images) created by a designer (e.g., a person having expertise in design). In some example embodiments, feature detection is performed on the designer photos to determine feature data for the depicted items. The items are then classified by the feature data to create classification indices for each item. Once an item is selected by a user (e.g., non-designer), search results can be generated for the user by using the classification indices to find similar images. In particular, for example, images that display items that have similar classification indices can be identified and returned as search results. To improve the accuracy and relevance of the search results, the similar images can be ranked according to selected aestheticism parameters such as style, and further ranked using user action data (e.g., image bookmarks). In this way, a user can browse relevant item results generated from highly curated designer images.

Figure 1:
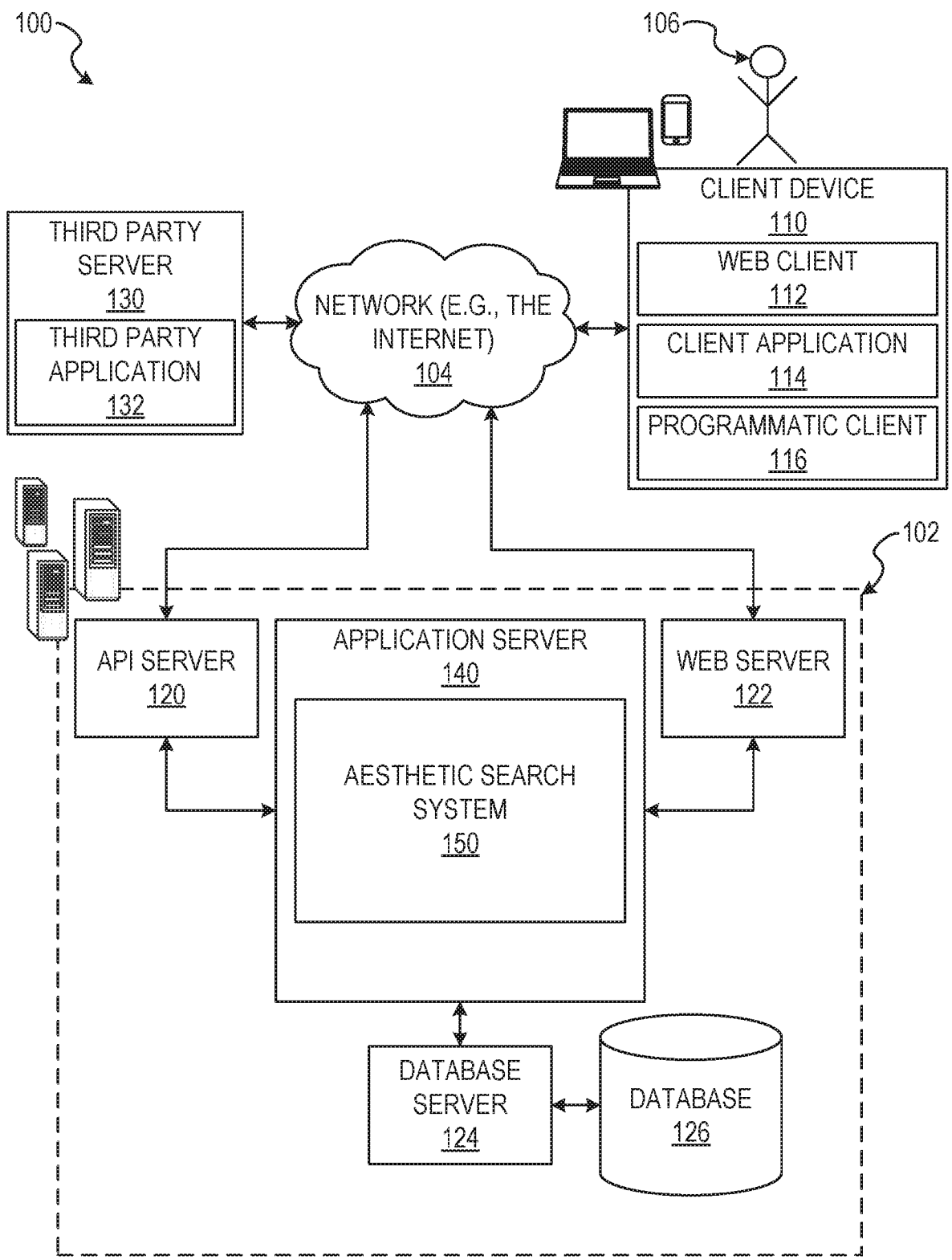
FIG. 1 is a block diagram illustrating a networked system for implementing an aesthetic search system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or a Wide Area Network (WAN)) to one or more client devices 110. In some implementations, a user (e.g., user 106) interacts with the networked system 102 using the client device 110. FIG. 1 illustrates, for example, a web client 112 (e.g., a browser), client applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic system, game console, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a WAN, a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide interoperability for Microwave Access (WiMax) network, another type of network, or any suitable combination thereof.

In some example embodiments, the client device 110 includes one or more of the client applications 114 (also referred to as "apps") such as, but not limited to, web browsers, clothing design apps, and interior design apps. In some implementations, the client application 114 include various components operable to present information to the user (e.g., the user 106) and communicate with the networked system 102.

The web client 112 accesses the various systems of the networked system 102 via the web interface supported by a web server 122. Similarly, the programmatic client 116 and client application 114 access the various services and functions provided by the networked system 102 via the programmatic interface provided by an Application Programming Interface (API) server 120. The programmatic client 116 can, for example, be a developer application or module for integration into the client application 114.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device. 110 via the network 104 to be presented to the user. In this way, the user can interact with the networked system 102 using the client device 110.

The API server 120 and the web server 122 are coupled to, and provide programmatic and web interfaces respectively to, one or more application server 140. The application server 140 can host an aesthetic search system 150. The application server 140 are, in turn, shown to be coupled to one or more database server 124 that facilitate access to one or more information storage repositories or database 126. In an example embodiment, the database 126 are storage devices that store information (e.g., designer photos, images of arrangements of items, individual item images, feature data, classification data) to be posted to the aesthetic search system 150.

Additionally, a third-party application 132, executing on third-party server 130, is shown as having programmatic access to the networked system 102 via the programmatic interface provided by the API server 120. For example, the third-party application 132, utilizing information retrieved from the networked system 102, supports one or more features or functions on a website hosted by a third party. The third-party website, for example, provides payment functions that are supported by the relevant applications of the networked system 102.

In some implementations, the aesthetic search system 150 provides functionality to receive a user selection of an item and return search results. The aesthetic search system 150 will be discussed further in connection with FIG. 2 below.

Further, while the network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 (e.g., aesthetic search system 150) can also be implemented as standalone software programs, which do not necessarily have networking capabilities.

Figure 2:
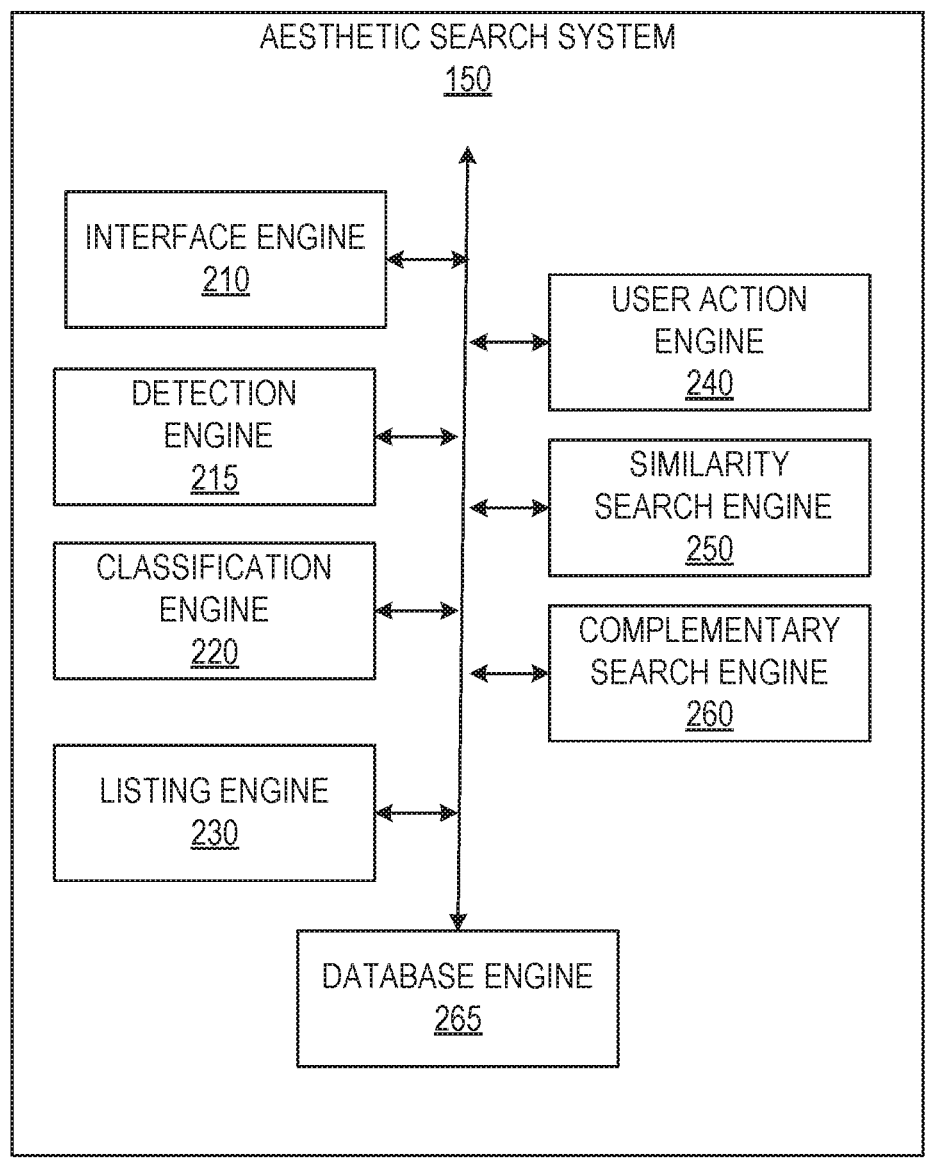
FIG. 2 is a block diagram showing example internal components provided within the aesthetic search system, according to some example embodiments.

FIG. 2 illustrates the aesthetic search system 150, according to some embodiments. As illustrated, the aesthetic search system 150 comprises an interface engine 210, a detection engine 215, a classification engine 220, a listing engine 230, a user action engine 240, a similarity search engine 250, a complementary search engine 260, and a database engine 265. The interface engine 210 is configured to interface with the web server 122 to communicate with the user 106 through his/her client device 110. For example, when the user 106 selects a user interface element displayed on the client device 110, the interface engine 210 receives the user selection as an input to the aesthetic search system 150. The interface engine 210 is further configured to interface with third-party applications (e.g., third party application 132) through the API server 120, to perform aesthetic searches programmatically, as according to some example embodiments. The classification engine 220 is configured to receive a set of images and classify features within each of the images. The listing engine 230 is configured to generate listings for display, e.g., for display on the client device 110. The user action engine 240 is configured to manage user action datasets for the aesthetic search system 150. For example, the user action engine 240 can identify which webpages have been viewed most, which items have been viewed most, or which items have been saved to a user collection most. The similarity search engine 250 is configured to identify items that have been classified as similar by the classification engine 220. The identified items are transmitted to the listing engine 230 for display to the user 106 in a listing. The complementary search engine 260 is configured to identify items that are complementary to a selected item. Complementary items are those items that are not in the same class as a given item, but that are usually included in a set together with the given item as complementary to the given item. For example, an orange and an orange peeler are different classes of items, but are complementary to one another as they are designed to function with each other, are commonly purchased with one another, or are commonly viewed on a website during a single browsing session. The database engine 265 is responsible for retrieving data from the database 126 through the database server 124.

Figure 3A:
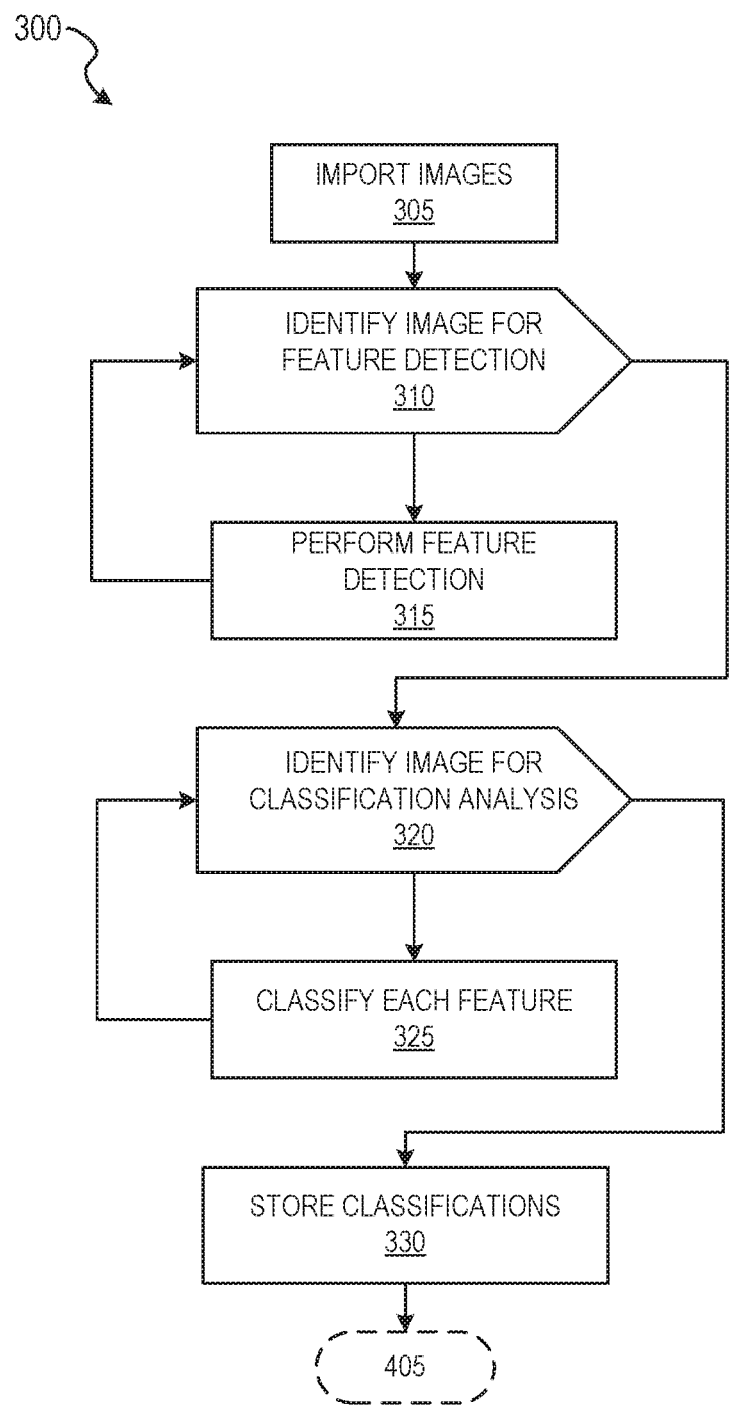
FIGS. 3A-C illustrate flow diagrams for implementing feature detection and feature classification, according to some example embodiments.

FIG. 3A illustrates a method 300 for classifying items captured in images, according to some example embodiments. At operation 305, the interface engine 210 receives a set of images. At operations 310 and 315, the detection engine 215 performs multiple feature detection loops to detect features in each of the images in the image dataset (e.g., the set of images received at operation 305). Feature detection includes labeling features in a given image with a boundary that denotes a region of interest (ROI). For example, an image may contain an image of a lamp, couch, and desk, all of which are considered features of the photo. In some embodiments, users browsing images of the image set (e.g., via the client device 110) are able to manually tag a feature by dragging a UT-element boundary over the feature. For example, a user viewing an image of a living room may drag a rectangular boundary over a sofa in the image to tag the rectangular boundary as an ROI. The user can further fill out fields to describe the tagged ROI. For example, after the user has dragged a rectangular boundary over the sofa, the user can input into a classification field, "sofa" to include as metadata for the ROI.

In some example embodiments, feature detection is performed programmatically through feature detection machine-learning schemes (e.g., Sobel edge filter, blob detection). As illustrated in FIG. 3, feature detection may be performed as part of a loop between operation 310 and operation 315, in which operation 310 identifies a next data item for processing and operation 315 processes the data item.

For example, at operation 310, the detection engine 215 loads a first image of the received image set into memory. At operation 315, the detection engine 215 performs feature detection on the image loaded into memory. For example, at operation 315, the detection engine 215 identifies features and labels the features as ROIs. The identified ROIs for the image can be stored as metadata with the photo. The process loops to operation 310, where the detection engine 215 loads the next image within the image dataset into memory, and, at operation 315, performs feature detection on the photo, again storing ROI data as metadata with the photo. In this way, the detection engine 215 may loop between operations 310 and 315 until all images in the image set have undergone feature detection.

In some example embodiments, classification of the features is performed as part of a loop (e.g., for loop, while loop) between operation 320 and operation 325, in which operation 320 identifies a next data item for processing and operation 325 processes the data item. For example, at operation 320, the classification engine 220 identifies a first imagers the image dataset. At operation 325, the classification engine 220 uses a classification scheme to classify each feature in the photo. In some embodiments, the classification scheme is configured to identify the feature using the ROI metadata stored with the photo. The deep learning scheme trains itself using a neural network to become more and more accurate at classifying a given feature as a type of item. In particular, each classification of a feature generates a vector that can be used to categorize the feature as a type of item. Examples of items include real-world items such as couches, chairs, lamps, plants, or other objects captured in a given photo. The vector acts as a classification index for the item (e.g., an array, each position in the array corresponding to a dimension) that allows large sets of features to be categorized in a machine-parsable way. The output of the classification may not dispositively classify a given feature as a "couch", but rather output a likelihood that a given feature is a couch.

After classification indices are generated for each feature in the image loaded into memory at operation 325, the classification engine 220 loads the next image into memory at operation 320 and performs classification on the features in the newly loaded photo. The classification engine 220 loops between operations 320 and 325 until a classification index (e.g., a deep learning-generated vector) has been generated for all features in all the images in the set. In some embodiments, at operation 330 the classification indices are stored as a classification index dataset in the database 126. An entry (e.g., row) for the classification index dataset includes an item or product identifier (e.g., title, serial, SKID, its corresponding classification index, and a listing of in which images the item appears. After feature detection and classification, the aesthetic search system 150 may continue to result generation processes (e.g., operation 405), which are discussed in further details with reference to FIG. 4.

Although FIG. 3A displays feature detection and classification as two sequential looping processes (e.g., a first loop for feature detection, and a second loop for feature classification), it will be appreciated that the operations of FIG. 3A can be ordered in different ways to achieve the same result. For example, a nested loop can be implemented that loads a photo, then performs feature detection, then performs feature classification, then loads the next photo, and so on.

In some example embodiments, the detection engine 215 is configured to detect the depicted items as image features (e.g., features). An image feature is a collection of information that describes the shape, edges, points, or other displayed attributes of a depicted item. The classification engine 220 can be configured to apply deep learning artificial neural networks to programmatically classify the items based on their detected features. An artificial neural network can be trained on a training dataset to tune the neural network to accurately create output data. Once the artificial neural network is trained, a model is created, which is used to identify newly received features and classify them as they are received. In particular, the detection engine 215 is trained on the images to create a detection model and the classification engine 220 is also trained on the images to create a classification model, as discussed in further detail below with reference to FIGS. 3B and 3C.

Figure 3B:
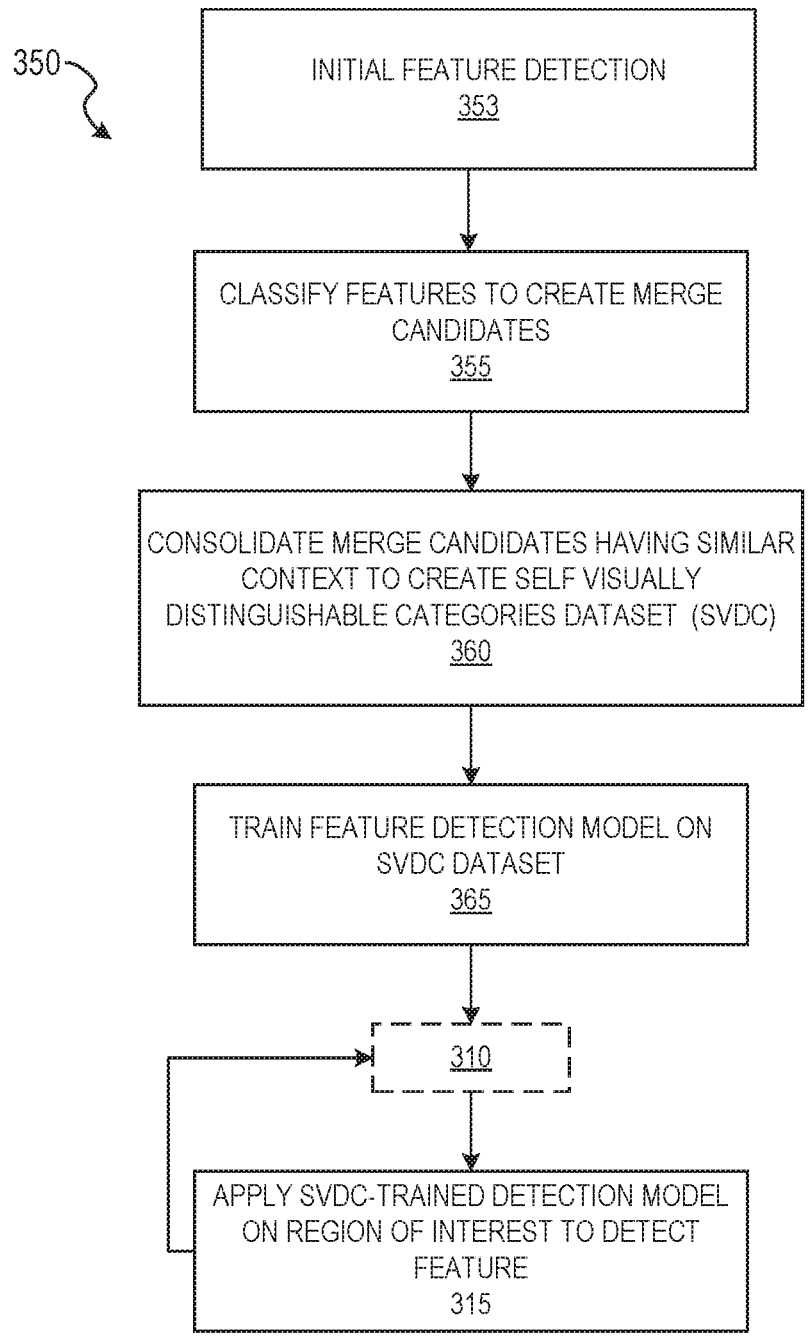

FIG. 3B shows a method 350 for training the detection engine 215 on the images to more accurately detect features within the images, according to some example embodiments. As discussed, the ROIs can be implemented as bounding boxes that circumscribe features. However, the items within the bounding box may have similar shapes or qualities (e.g., color), which can result in noisy feature detection. For example, a vase and a hanging lamp may both resemble a globe shape, and thus both may be described as two-dimensionally circular within a given ROI. However, a vase and hanging lamp are clearly different items that are used in different contexts. Elements around the depicted items can result in further feature detection errors. For example, if a chair is displayed in front of a tiled-wall, the detection engine 215 may improperly identify tile borders of the tiles as part of the legs of the chair.

To address these issues, at operation 353, the detection engine 215 receives the images as input and performs initial feature detection on the areas bounded by the boundary boxes (e.g., ROIs). At operation 355, the classification engine 220 classifies the features detected at operation 353 to create an initial feature dataset of candidates for merging. At operation 360, the classification engine 220 merges visually similar features, such as a circular lamp and a circular vase, to create a self visually distinguishable categories dataset (SVDC). At operation 365, the detection engine 215 is trained on the SVDC to create a detection model.

After the detection engine 215 is trained on the SVDC-based detection model, the operations proceed as discussed in FIG. 3A. For example, as illustrated in FIG. 3B, at operation 310 the detection engine 215 identifies an item for processing, at operation 315 the detection engine 215 applies the processing to the item, if the circular feature was a hanging lamp, which typically have cords extending from the top of the lamp to the ceiling, the detection engine 215 would more readily include pixels of the cord as part of the feature.

Figure 3C:
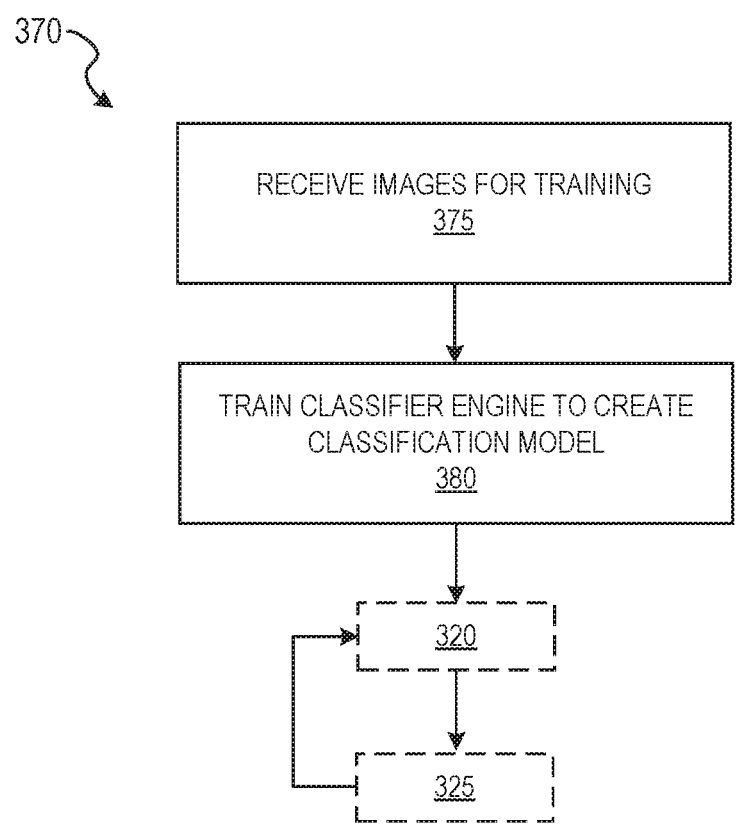

In some example embodiments, to more accurately classify the features, the classification engine 220 is trained to create a classification model, as illustrated by a method 370 in FIG. 3C. In particular, according to some example embodiments, at operation 375 item images (e.g., images of items without a background) are input into the classification engine 220 as training data. At operation 380, the classification engine 220 undergoes training on the item images to create a classification model. After the classification model is created, the method returns to operations 320 and 325, as discussed above with reference to FIG. 3A.

Figure 4:
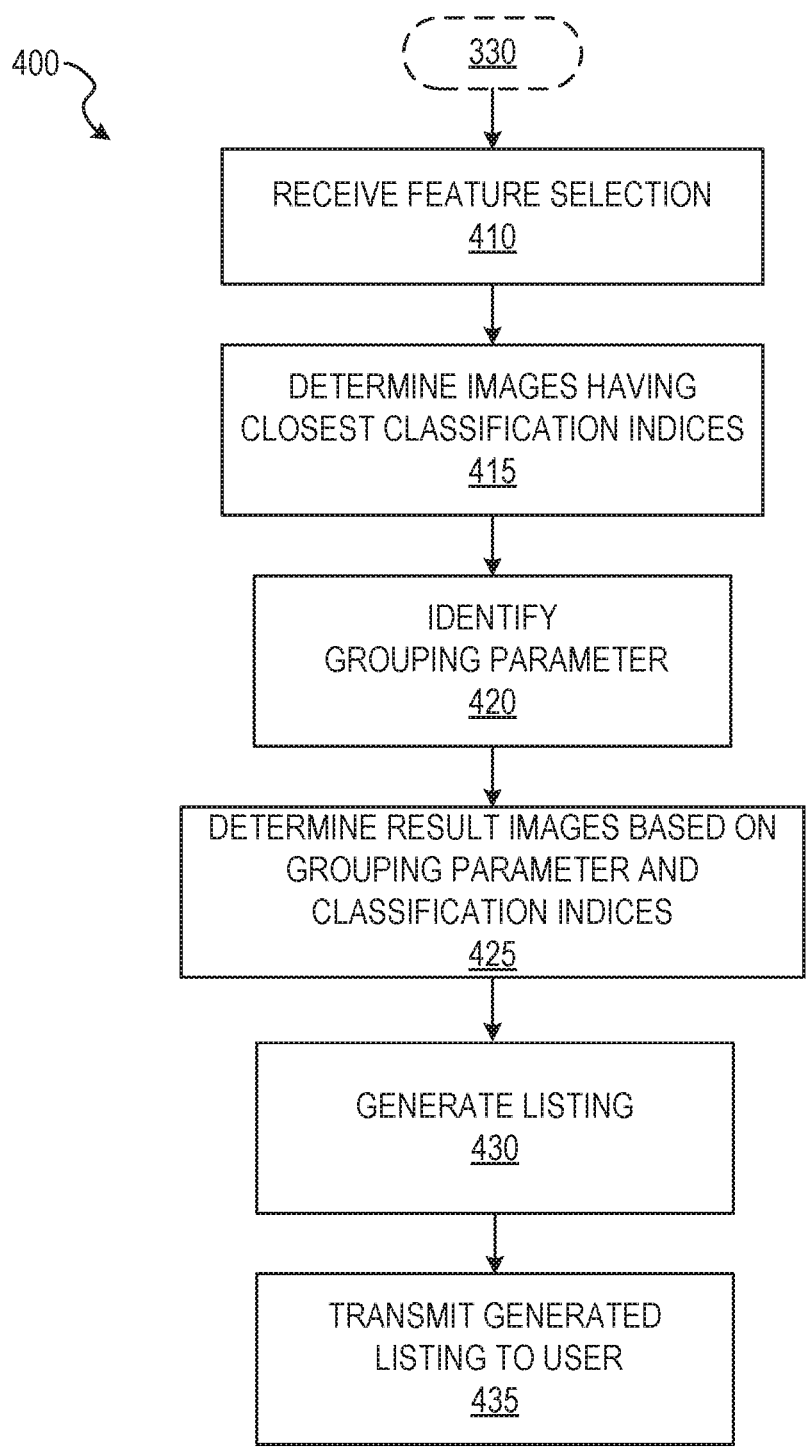
FIG. 4 illustrates a flow diagram for returning results using a grouping parameter, according to some example embodiments.

FIG. 4 illustrates a method 400 for generating similarity-based listings, according to some example embodiments. At operation 410, the interface engine 210 receives selection of a feature in an image displayed on the client device 110. As discussed, each feature corresponds to a depicted item (e.g., a couch), which has a classification index. At operation 415, the similarity search engine 250 accesses the classification dataset, identifies which classification indices are closest to the classification index of the selected item (e.g., the item that corresponds to the feature selected), and further identifies which images display the closest matching items. The images that display the closest matching items are assigned as a matching subset of images. At operation 420, the similarity search engine 250 identifies a grouping parameter. The grouping parameter specifies an attribute that can be used to further qualify the images. For example, the grouping parameter may specify that only images from the same interior designer should be included in the results. Further details of the grouping parameter are discussed with reference to FIGS. 5-7 below.

At operation 425, the similarity search engine 250 determines which images should be included as listing search results based on whether the images have the closest matching items (e.g., closest matching classification indices) and further based on whether the images satisfy the grouping parameter. At operation 430, the listing engine 230 generates a listing using the search results determined at operation 425. At operation 435, the listing engine 230 transmits the generated listing for display on the client device 110.

Figure 5:
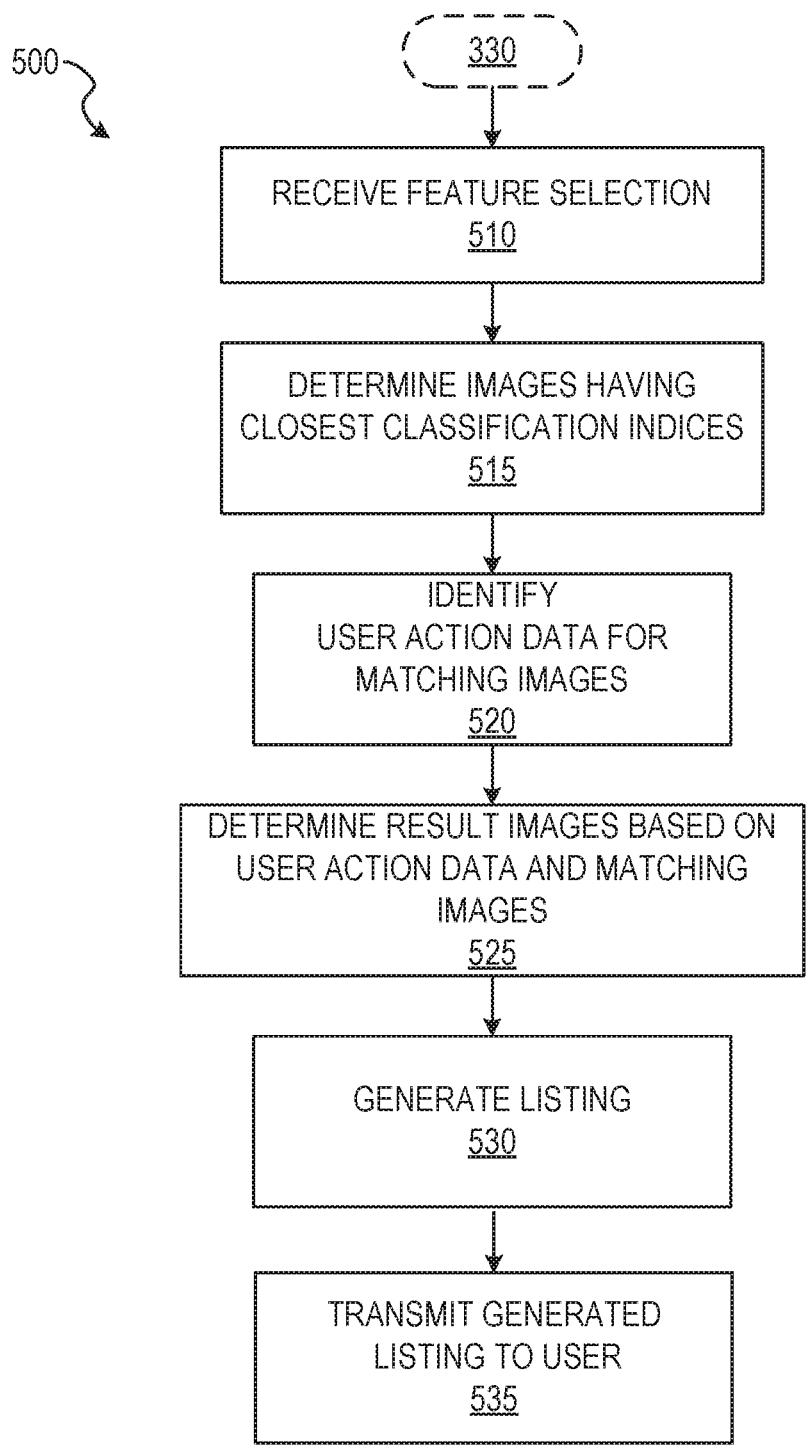
FIG. 5 illustrates a flow diagram for a method for returning results using user action data, according to some example embodiments.

FIG. 5 is a flow diagram for a method 500 for generating similarity-based search results based on user action data. In some example embodiments, users (e.g., user 106) can create a user profile on the application server 140. The user profile is configured with the ability to maintain an image gallery of images for later viewing. User action data is interaction data generated by the user's browsing through the images on the application server 140. Examples of user action data include: clicks of a link (e.g., image link), page views, bookmarks, marking a link as a favorite (e.g., a "like" on social media platforms), and image saves (e.g., an occurrence of a user saving an image to his/her gallery or profile). The method 500 of FIG. 5 shows a programmatic approach for returning popular image results that include the closest ranked items. The method 500 of FIG. 5 is similar to the method 400 of FIG. 4, except that the grouping parameter (at operations 520 and 525) is defined as user action data.

At operation 510, the interface engine 210 receives selection of a feature in an image displayed on the client device 110. At operation 515, the classification engine 220 identifies the classification index for the selected feature, determines which classification indices are closest to the selected classification index, and identifies images that include the items having the closest matching classification indices. At operation. 520, the user action engine 240 identifies the user action data (e.g., clicks, saves) for each of the images and ranks the images based on which images have the highest amounts of user interaction (e.g., most clicks, most saves to a gallery). At operation 525, the similarity search engine 250 determines which images to return as result images based on the user action data and whether the images have the closest matching items (e.g., closest matching classification indices). For example, in some example embodiments, the similarity search engine 250 may first determine which images have features that are most similar to the received feature (e.g., the selected feature of operation 510) based on their closest matching classification indices. Of those images having the closest matching features, the similarity search engine 250 may further select a top matching set (e.g., top ten images having the most similar features). The similarity search engine 250 may access the user action data rankings to determine which of the top matching set are also user favorites. For example, of the top ten matching images, the eighth image may have only the eighth-closest matching features but may be the image most saved to user image galleries according to the user action data. As such, the similarity search engine 250 may reorder the top ten matching images according to user action data ranking (e.g., putting the eighth-closest matching image in first place because that image is more popular among users, greatest-to-least order, descending order). Further, in some example embodiments, the similarity search engine 250 may reduce the images that have been reordered according to user action data from the top ten images to the top four (e.g., greatest-to-least manner). These four images that have the closest matching features and which have been re-ranked according to user action data are returned as result images at operation 525.

Continuing, at operation 530, the listing engine 230 generates a listing for display that includes the result images. At operation 535, the listing engine 230 transmits the generated listing to the client device for display.

Figure 6:
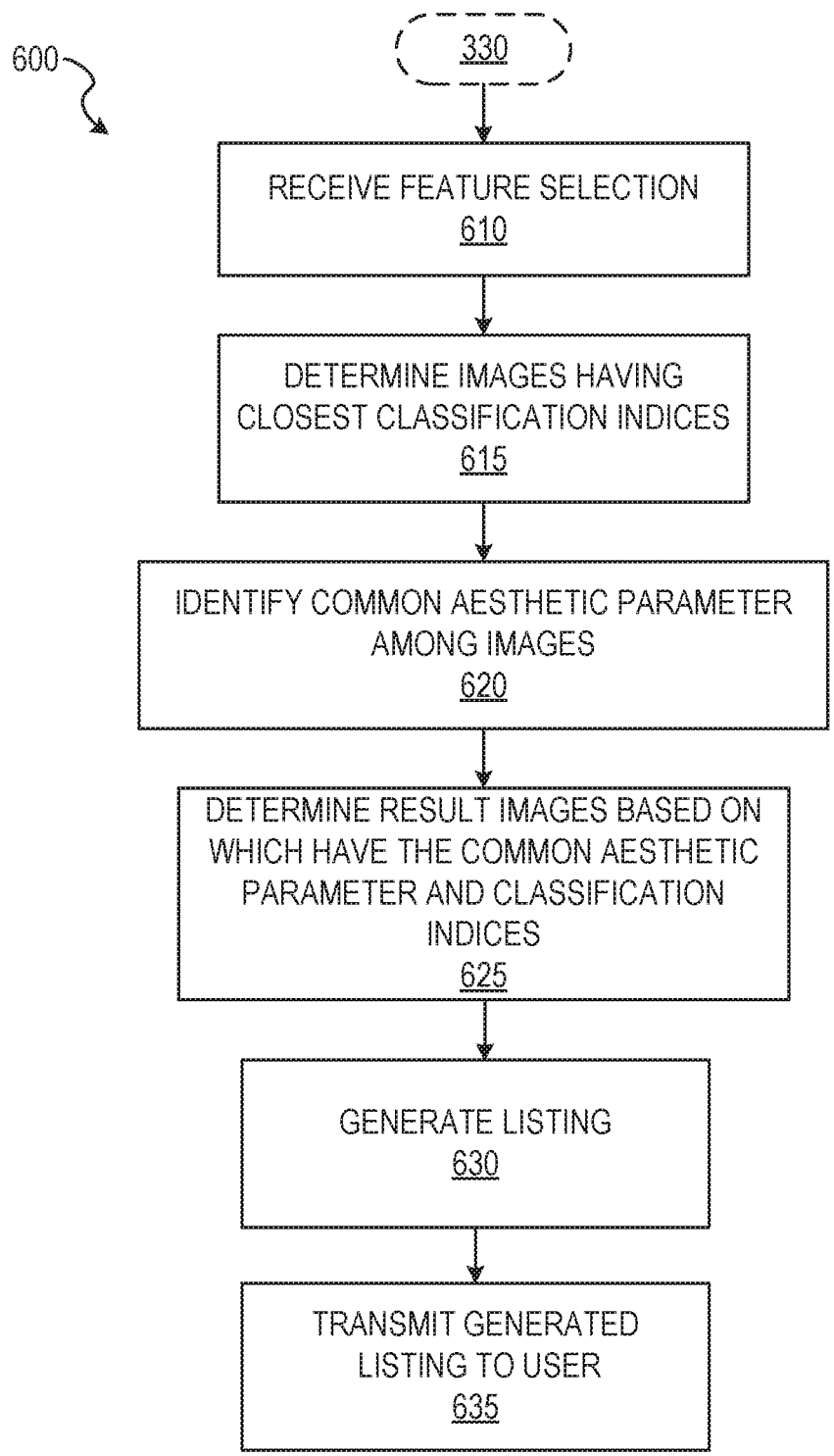
FIG. 6 illustrates a flow diagram for a method for returning results using an aesthetic parameter, according to some example embodiments.

FIG. 6 is a flow diagram for a method 600 for generating similarity-based search results based on an aesthetic grouping parameter. As discussed, the images received for feature detection and feature classification may be images of artistic arrangements. For example, an interior designer may arrange individually selected pieces of furniture, specific wall and floor styles, and specific lighting into an aesthetically pleasing result, which is captured in a photo. Such aesthetic qualities are important to users browsing images. Conventionally, a user trying to find items for his or her house in the aesthetic style of a given image is forced to sift through item after item, trying to find items that match the artistic style of the artistically designed arrangement captured in the photo. The process of sifting through images is time-consuming and inconvenient for the user. Further, a user may not trust his or her judgement in selecting items that are not physically in front of him or her, but instead reduced to an image viewable through the Internet. Further, a user having little design experience may not like or trust his or her own artistic capabilities, and thus may forgo browsing any images online, and instead visit showrooms, etc. Each of the images having an artistic arrangement can have metadata that describes the aesthetic style of the artistic arrangement. For example, an image of a sparse white kitchen can have a style parameter labeling it as "minimalist", or an image of a frescoed foyer can have a style parameter labeling it as "Mediterranean". FIG. 6 illustrates a method 600 for returning image results that match an aesthetic style of a selected item (e.g., a selected feature which corresponds to an item).

At operation 610, the interface engine 210 receives selection of a feature in a image displayed on the client device 110. At operation. 615, the classification engine 220 identifies the classification index for the selected feature, determines which items have classification indices that are closest to the selected classification index, and identifies images that include the items having the closest matching classification indices. At operation 620, the similarity search engine 250 determines a common aesthetic parameter among the images having the closest matching items. For example, at operation 620, the similarity search engine 250 may determine that the most common aesthetic parameter (e.g., a parameter describing a style of a photo) is "minimalist". At operation 625, the similarity search engine 250 determines result images based on which of the images have the closest matching items, and further based on which of the images have the most common style (e.g., which of the result images have the most common aesthetic parameter), as described above. The images having the closest matching items and in the most common aesthetic parameter (e.g., style) may be returned by the similarity search engine 250 as the result images. In some example embodiments, the images are further reduced according to user popularity as described in FIG. 5. That is, of the images having the closest matching items in the most common style, the top five according to user popularity (e.g., according to user action data, view count, and gallery saves) are returned as result images.

Further, in some example embodiments, the style of the image in which the feature was selected (e.g., the feature received at operation 610) is used to set the aesthetic parameter instead of using the most common style, as in the approach above. For example, at operation 610 the user selects a lamp in a image having a minimalist style. At operation 620, only images having the same aesthetic parameter "minimalist" can be returned as results. At operation 630, the listing engine 230 uses the result images to generate a listing for display. At operation 635, the listing engine 230 transmits the listing to the user 106 for display on the client device 110.

Figure 7:
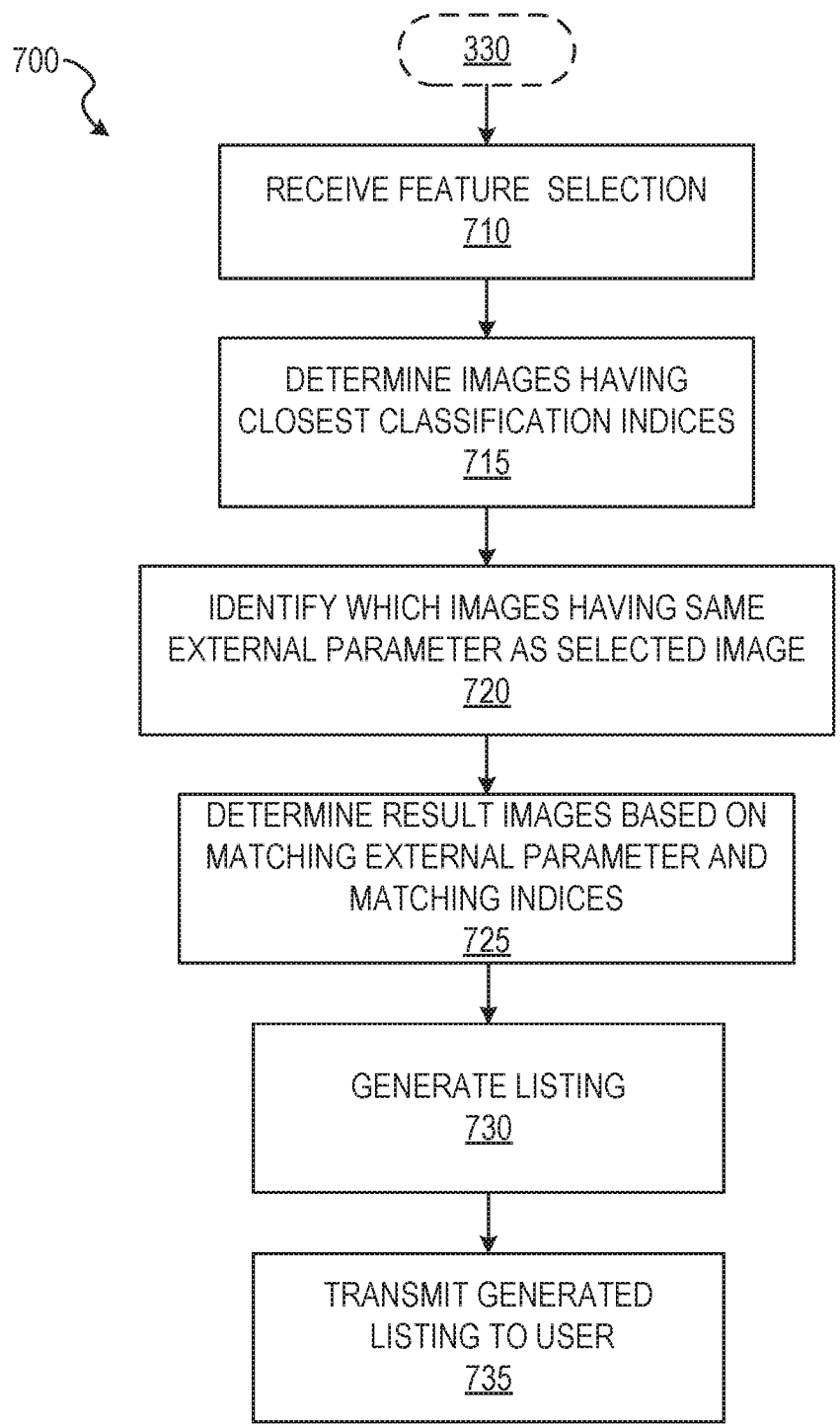
FIG. 7 illustrates a flow diagram for a method for returning results using a user-specified parameter, according to some example embodiments.

FIG. 7 shows a flow diagram for a method 700 for generating similarity-based search results based on an external grouping parameter. An external grouping parameter is a grouping parameter that describes the image based on external factors, such as a zip code (e.g., only return results for items locally available, buildable by local contractors, or other geographic location based parameters) or designer group (e.g., a collection of images from a specific designer). For example, a user may select an item and only want search results returned that match a specific famous designer.

At operation 710, the interface engine 210 receives selection of a feature in an image (e.g., the user 106 is viewing an image and selects a lamp in the photo). At operation 715, the classification engine 220 identifies the classification index for the selected feature, determines which items have classification indices that are closest to the selected classification index, and identifies images that include the items having the closest matching classification indices. At operation 720, the similarity search engine 250 determines which of the images having the closest matching items further matches a specified external grouping parameter. For example, the user may have selected a kitchen cabinet at operation 710, and specified a zip code grouping parameter so that only images having cabinets buildable by local contractors are returned. As a further example, the external grouping parameter may be a designer parameter that specifies that only images from a certain designer should be returned.

At operation 725, the similarity search engine 250 determines result images based on which of the images have the closest matching items, and further based on which of the images match one or more specified external parameters. Further, as discussed, the similarity search engine 250 may further limit or sort the returned images based on user action data, e.g., which of the images is most popular among users. At operation 730, the listing engine 230 uses the result images to construct a listing for display. At operation 735, the listing engine 230 transmits the listing to the user 106 for display on the client device 110.

Figure 8A:
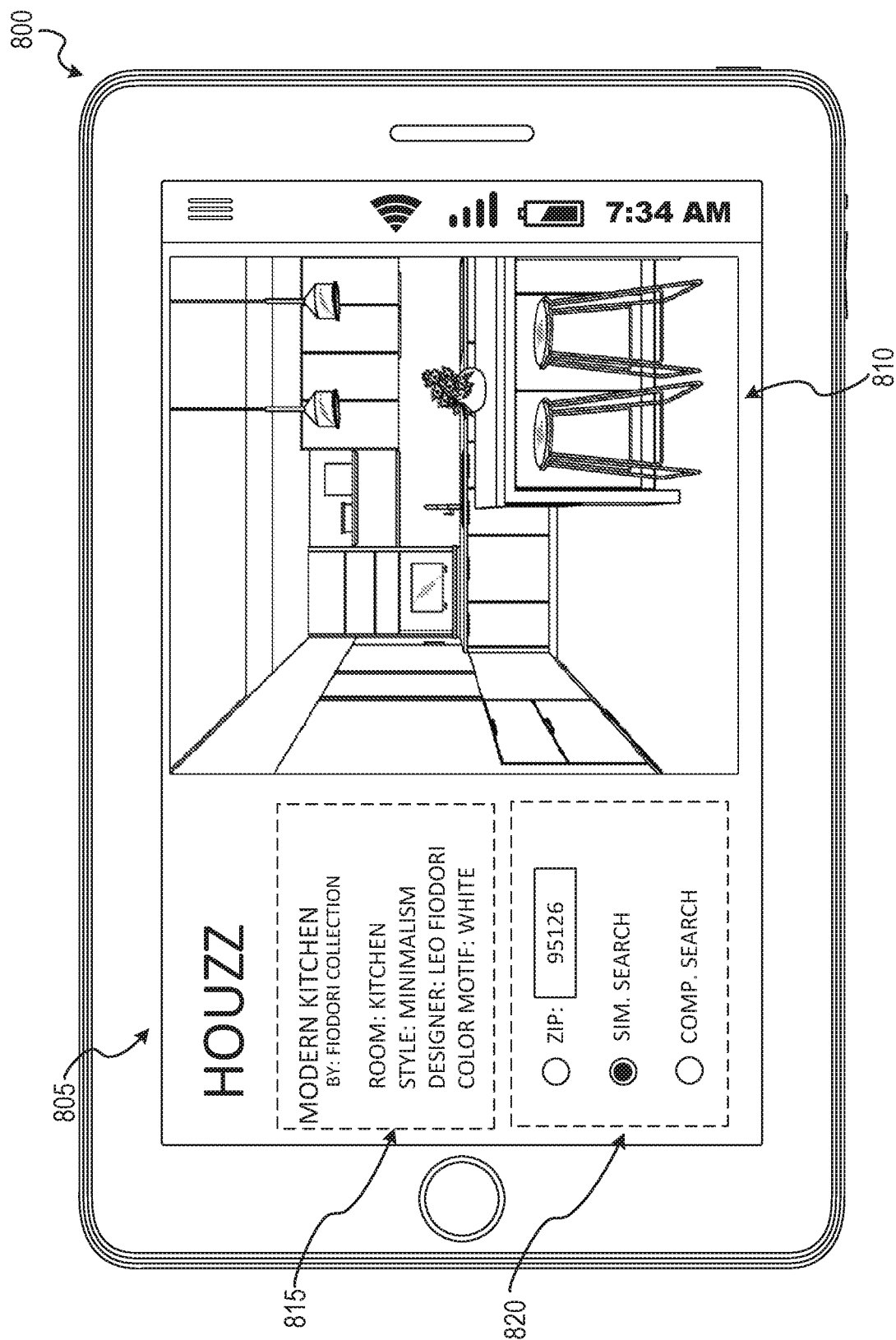
FIGS. 8A-D illustrate example user interfaces for returning similar item search results using the aesthetic search system, according to some example embodiments.

FIG. 8A shows an example of a client device 800 displaying a user interface 805 (e.g., user interface of a display device) generated by the aesthetic search system 150, according to some example embodiments. In the example illustrated, the user interface 805 is configured as a webpage from a website having aesthetic search functionality via an integrated aesthetic search system 150. As illustrated, a designer image 810 is displayed which shows an artistic arrangement of a kitchen comprising stools, a vase, and lamps, among other items. The stools, vase, and lamps are examples of items (e.g., physical items) that correspond to features in the designer image 810. The designer image 810 is an individual example of a designer photo, and it will be appreciated that in some example embodiments, the application server 140 is part of a web platform that manages millions of designer images from different designers, and further manages items (e.g., lamp, stool, couch) as inventory, each of which may be displayed in one or more of the designer images.

The user interface 805 further includes image metadata 815, including for example "modern kitchen", which is an example title of the designer image 810. The image metadata 815 further includes a room attribute of "kitchen", a style attribute of "minimalism", a designer attribute of "Leo Fiodori" (e.g., an example designer responsible for the artistic selection and arrangement of the items in the designer image 810), and a color motif attribute of "white". Any data item or attribute of the image metadata 815 can serve as a grouping parameter in the methods discussed above, with reference to FIGS. 3A-7, and discussed in further detail with reference to the subsequent figures.

The user interface 805 further includes a parameter menu 820 with one or more user interface elements. The user interface elements include, strictly as an example, text input fields, drop-down menus, checkboxes, and the like that allow a user to input information and specify filters or further grouping parameters. For example, the parameter menu 820 can include a text field for the user 106 to input a zip code, which can be used as a grouping parameter, as discussed with reference to FIG. 7.

Figure 8B:
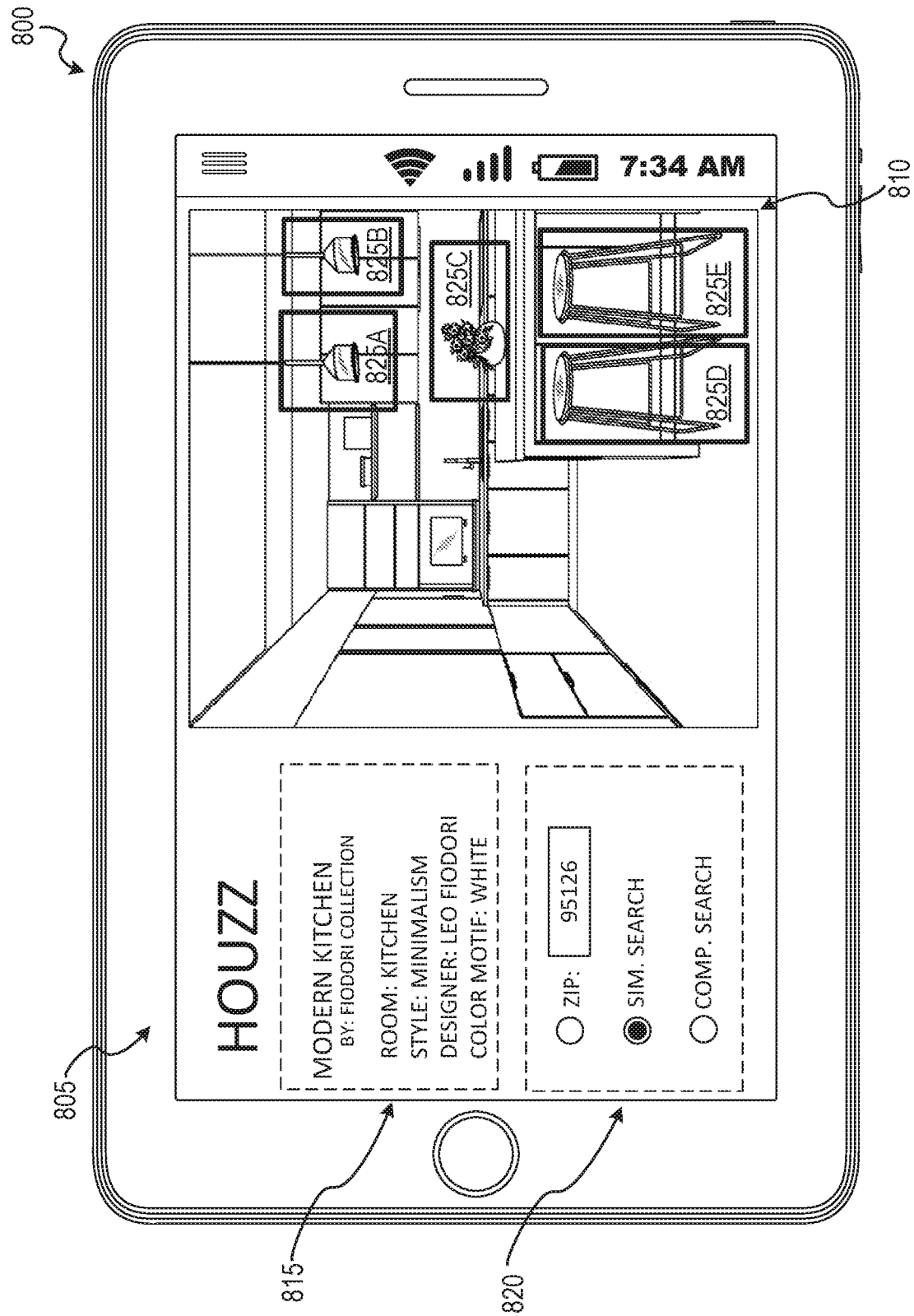

FIG. 8B illustrates an example of regions of interest 825A-E as boundaries that enclose underlying features. For example, the regions of interest 825A and 825B both set a boundary for the lamps, the region of interest 825C sets a boundary for the vase feature, and the regions of interest 825D and 825E set the boundaries for the underlying stool features. As discussed above, the regions of interest 825A-E can be detected via machine learning or through user tags (e.g., dragging an ROI over a feature). The regions of interest 825A-E may be used to classify the features and generate classification indices as discussed above.

Figure 8C:
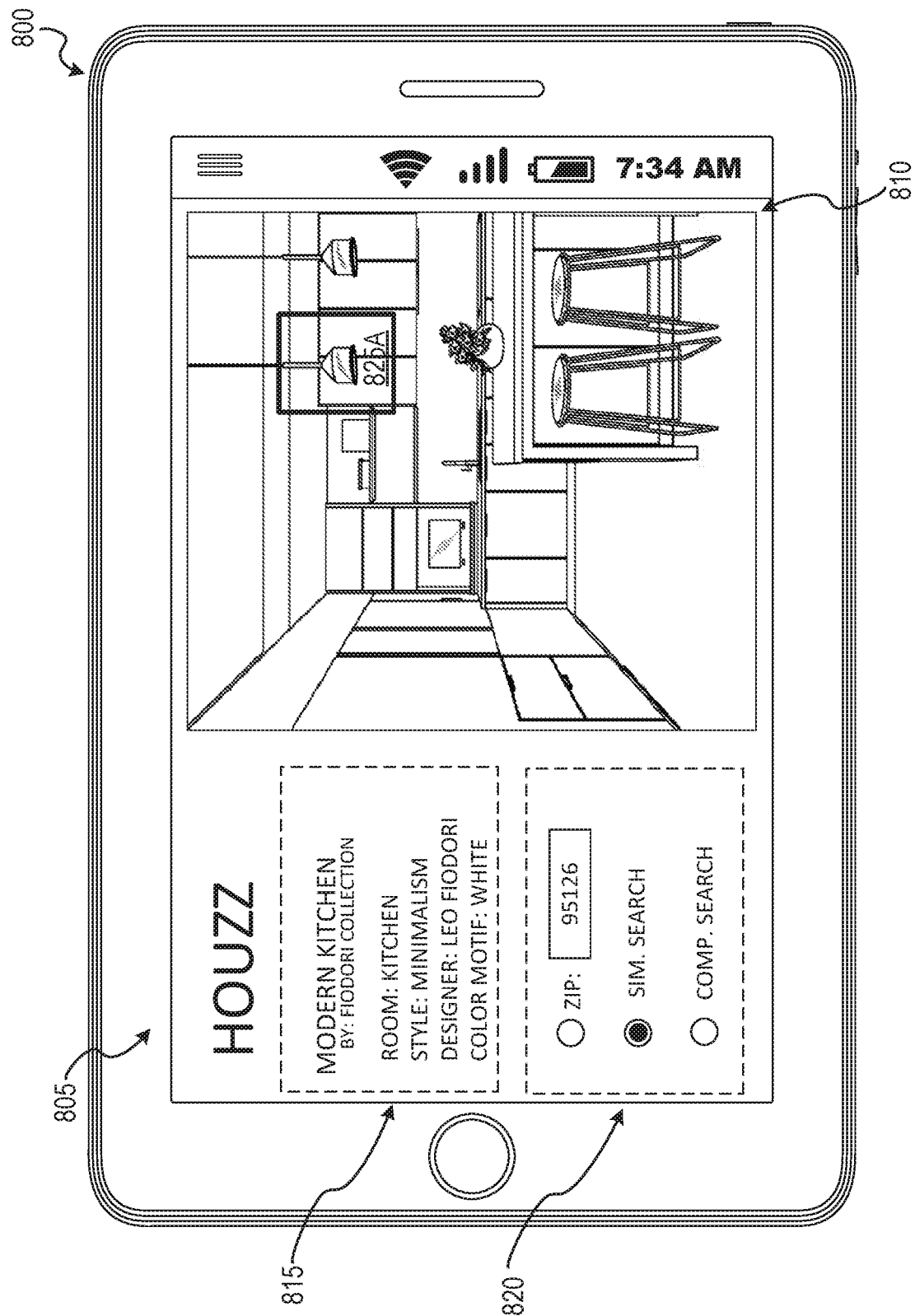
Figure 8D:
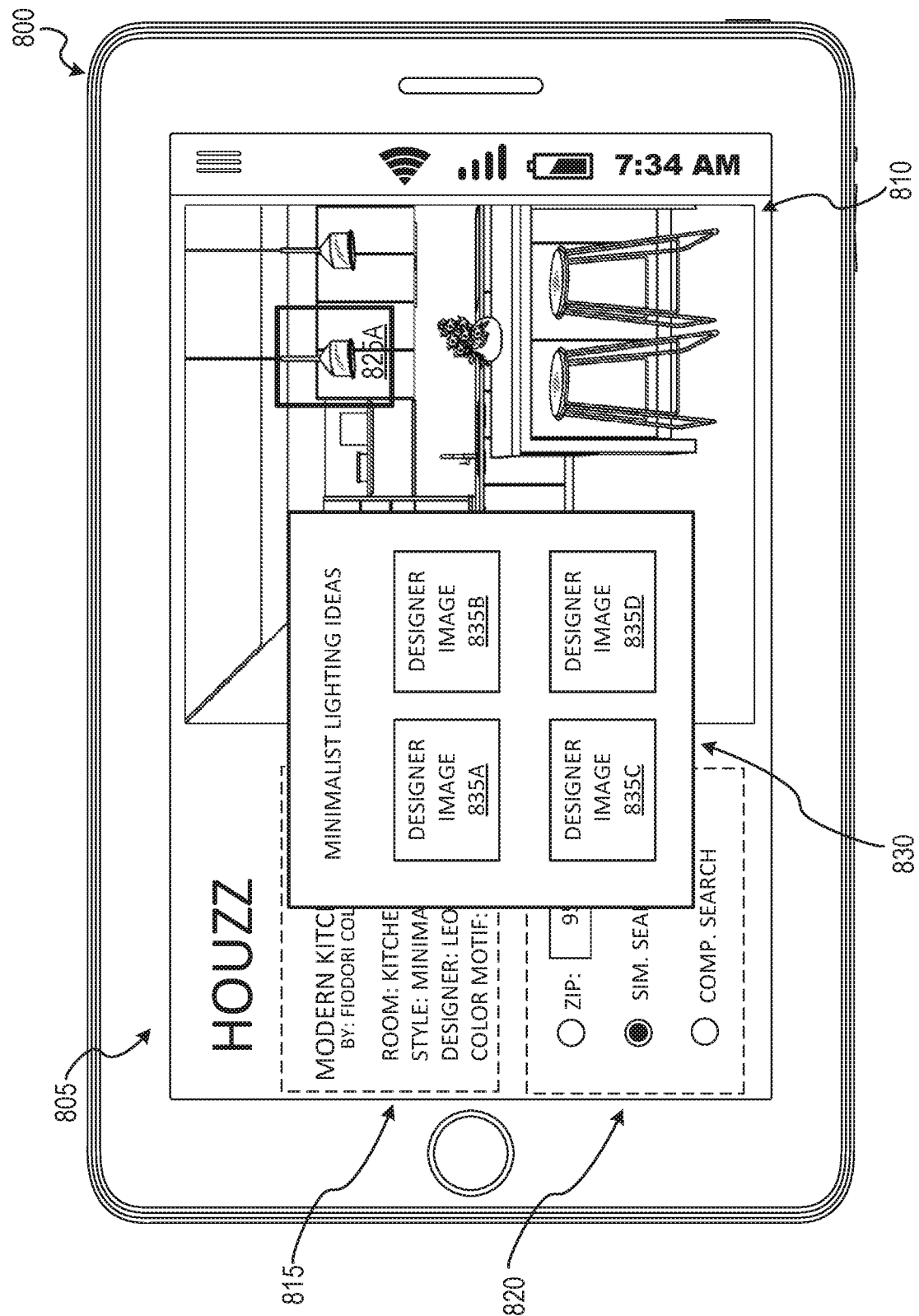

FIG. 8C illustrates an example of a user selecting a portion of the image to indicate a search for further options of the underlying item. For example, as illustrated in FIG. 8C, the user 106 may have used the touchscreen of the client device 800 to select the lamp in the region of interest 825A. The client device 800 sends selection of the region of interest 825A, the corresponding figure, or the item to the aesthetic search system 150. The aesthetic search system 150 identifies the classification index for the selected portion of the image (e.g., the classification index of the lamp item in the region of interest 825A). Further, the aesthetic search system 150 then determines which items in the classification index dataset most closely match the classification index of the lamp in the region of interest 825A. Then the aesthetic search system 150 determines in which images the most closely matched items appear. Due to limited screen space, or to maintain attention of the user, a small subset (e.g., result images) of the images having matching items are determined using the grouping parameter approaches described above, with reference to FIG. 4-7. FIG. 8D shows an illustrated example.

In FIG. 8D, assume that the aesthetic search system 150 identifies six lamps as having classification indices close to that of the selected lamp item (e.g., to the classification index of the lamp item in the region of interest 825A). Continuing the example, the aesthetic search system 150 determines that the six lamps appear in 427 designer images. The aesthetic search system 150 then determines which of the 427 images users have most saved to their respective image galleries (e.g., via the user action operations of FIG. 5). The listing engine 230 then generates a listing 830 with the top four images included as result images 835A-D and displays the listing 830 on the client device 800. In some embodiments, after the images are identified, the items appearing in the images and not the images themselves are displayed as the result images 835A-D.

Upon selecting one of the result images 835A-D, the user 106 is directed to a webpage displaying the selected photo, along with details about the selected image and optional checkout modules to purchase items displayed in the photo, according to some example embodiments. Accordingly, in this way, the user can leverage the designer's expertise as reflected in features in the image to more efficiently browse through relevant search results.

In some example embodiments, the aesthetic search system 150 receives selection of an item in an image and can determine which items are complementary to the selected item and further return results to the user showing the complementary items. Complementary items are those items that are categorically different from one another but are configured to work with each other, are commonly viewed together or purchased together, or otherwise function in concert with each other. In the design industry, associating items as complementary can be a difficult task, especially, for example, if the items are unlike one another. For instance, a minimalist room having a white color motif, e.g., white chair, white table, and white sink, may nonetheless include an oddly shaped hanging lamp with jagged edges in an artistically loud contrasting color, such as gold. The items exhibiting the white color motif and the gold item are unlike one another but are nonetheless complementary to one another, as designers with style expertise may commonly place one near the other in designer images. Conventionally, identifying complementary items is performed based on historical analysis of user transaction data. However, if the designer items are expensive or if the style in which the designer items are placed together is very new, there may not be enough historical data on which to perform historical analysis. Thus the user is left to his or her own judgement, sifting through potentially hundreds or thousands of items trying to match items to a motif of designer-created images. FIGS. 9A-11 show approaches for efficiently finding non-obvious complementary items (e.g., white chair and a gold lamp) in an accurate programmatic way.

Figure 9A:
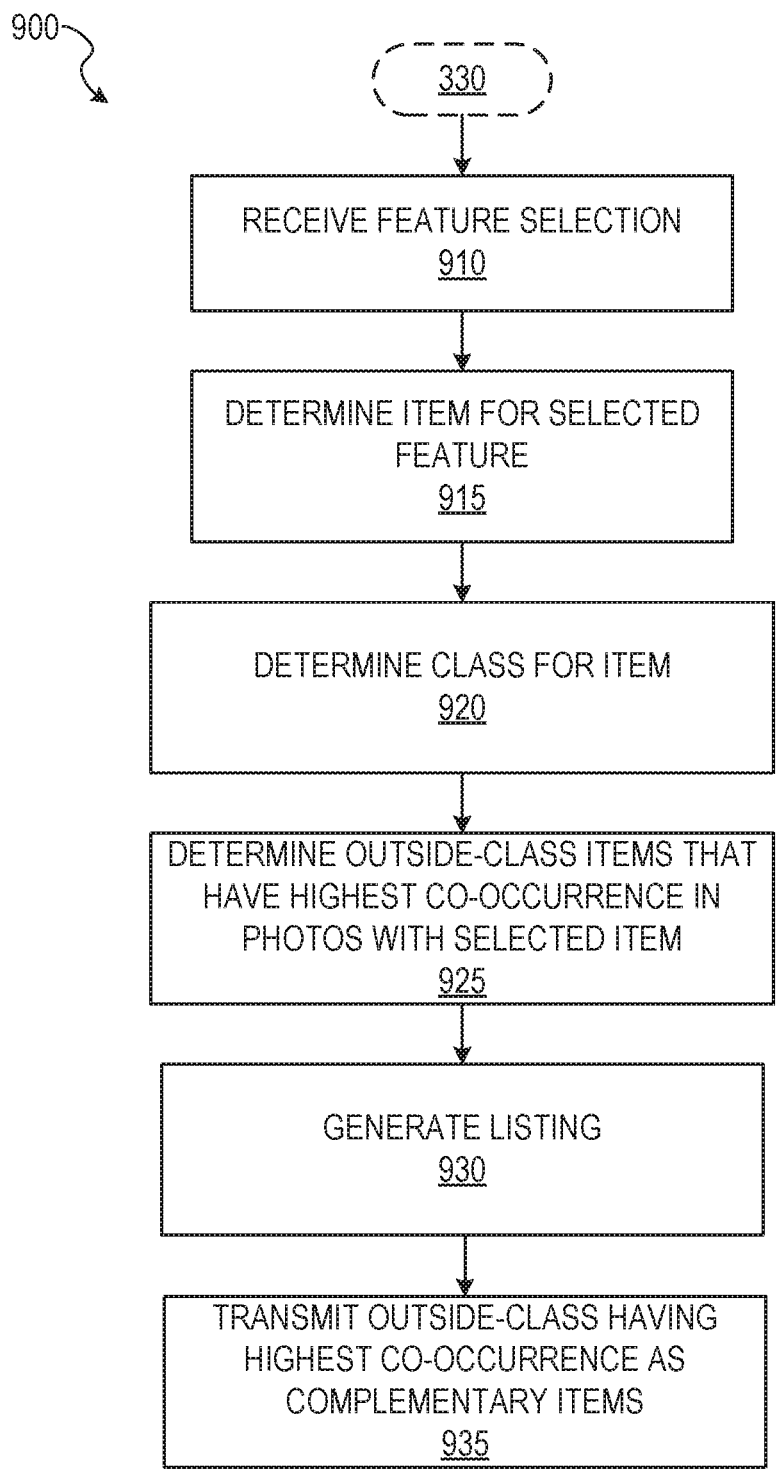
FIGS. 9A and 9B illustrate flow diagrams for returning complementary item search results, according to some example embodiments.

With reference to FIG. 9A which illustrates method 900, operations 910 to 930 may be performed after operation 330 of FIG. 3A so that the aesthetic search system 150 has a trained detection model and a trained classifier model. At operation 910, the interface engine 210 receives selection of a feature (e.g., selection of the ROI circumscribing the underlying feature). At operation 915, the complementary search engine 260 determines which item corresponds to the selected feature (e.g., accessing feature data that correlates features to items via the database engine 265). At operation 920, the complementary search engine 260 accesses item data in the database 126 (e.g., via the database engine 265) to determine the class of the item. Item classes may be colors (e.g., white lamp, white chair), types (e.g., chair, sink, pillow), or other attributes that describe an item. In some example embodiments, two or more item classes are used to describe a given item, e.g., a gold lamp, where gold is a first class of color and lamp is a second class of item type. At operation 925, the complementary search engine 260 determines which items appear most commonly with the selected item, where appearance together is considered a co-occurrence. In particular, at operation 925, the complementary search engine 260 determines which outside-class items have the highest co-occurrence with the selected item, where outside-class refers to items having class parameters that are different from the class parameters of the selected item. For example, assuming that color and item type are the relevant classes for consideration, if the selected item is a white lamp, and the two most commonly occurring items are a white vase and a gold vase, then at operation 925, the gold vase would be selected instead of the white vase as the gold color is outside the white color class of the selected item.

At operation 930, the listing engine 230 generates a listing configured to display the outside-class items having the most co-occurrences with the selected item. At operation 935, the listing engine 230 transmits the generated listing for display to the user 106 on a display screen of the client device 110.

Figure 9B:
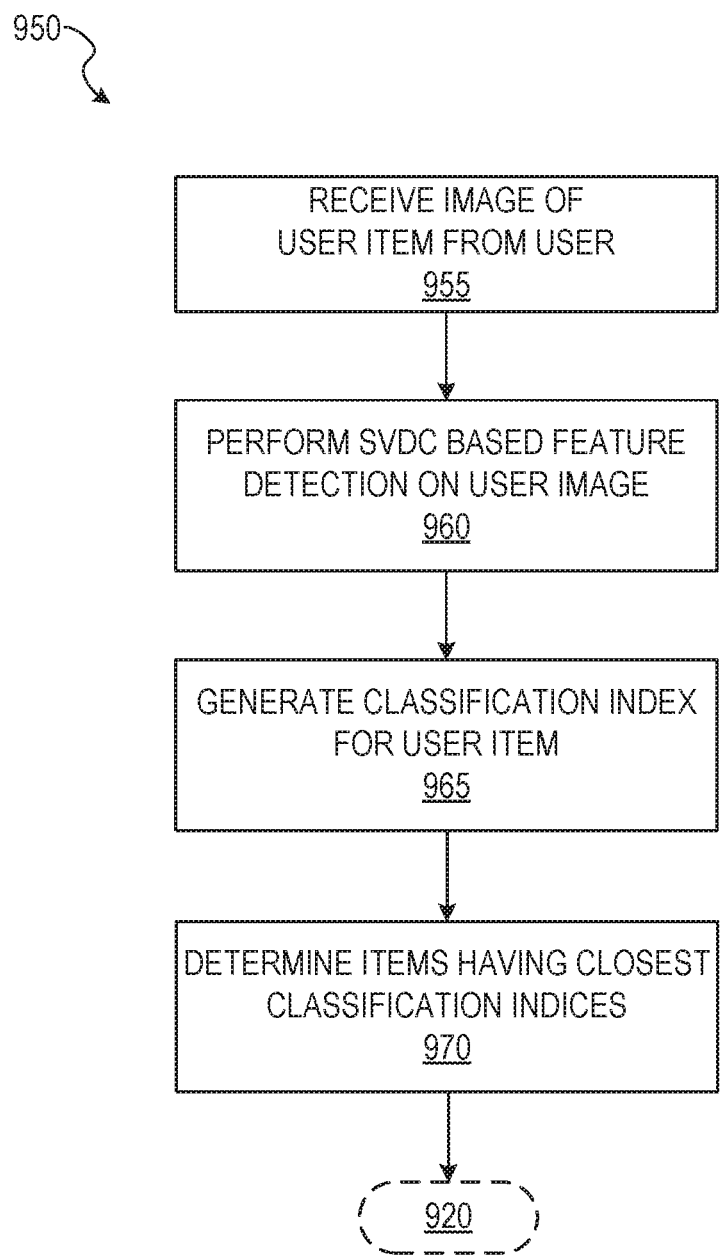

FIG. 9B shows a flow diagram for a method 950 for selecting complementary items for a user-provided image. A user-provided image is an image that is uploaded or otherwise provided by the user to the aesthetic search system 150. In contrast to the approach of FIG. 9A, in which a user selects the item by selecting a feature of an image, the approach of FIG. 9B describes finding complementary items from an image of a product that has not undergone feature analysis and classification. For example, the user 106 may upload a picture of an image of a chair in his or her own living room to the aesthetic search system 150.

At operation 955, the interface engine 210 receives an image from the user 106 through the client device 110. At operation 960, the detection engine 215 performs SVDC-based feature detection on the user image, as described above with reference to FIGS. 3A and 3B. At operation 965, the classification engine 220 receives the feature data from the detection engine 215 and performs classification on the item in the user image to generate a classification index, as described above with reference to FIGS. 3A and 3C. At operation 970, the complementary search engine 260 determines which pre-known items (e.g., inventory items) have classification indices that are closest to the classification index of the image in the user-provided image. In some example embodiments, pre-known items are those items used to generate the classification model or items that have existing classification indices. Once the classification index is generated for the item depicted in the user-provided image, the process may continue, according to some example embodiments, to operation 920, in which a class (e.g., color, type) for the item is determined and outside-class items can be determined and used to provide complementary item results to the user. In some example embodiments, the similarity search engine 250 is used to determine images having similar contexts (e.g., images that display items having similar classification indices as described above.

Figure 10A:
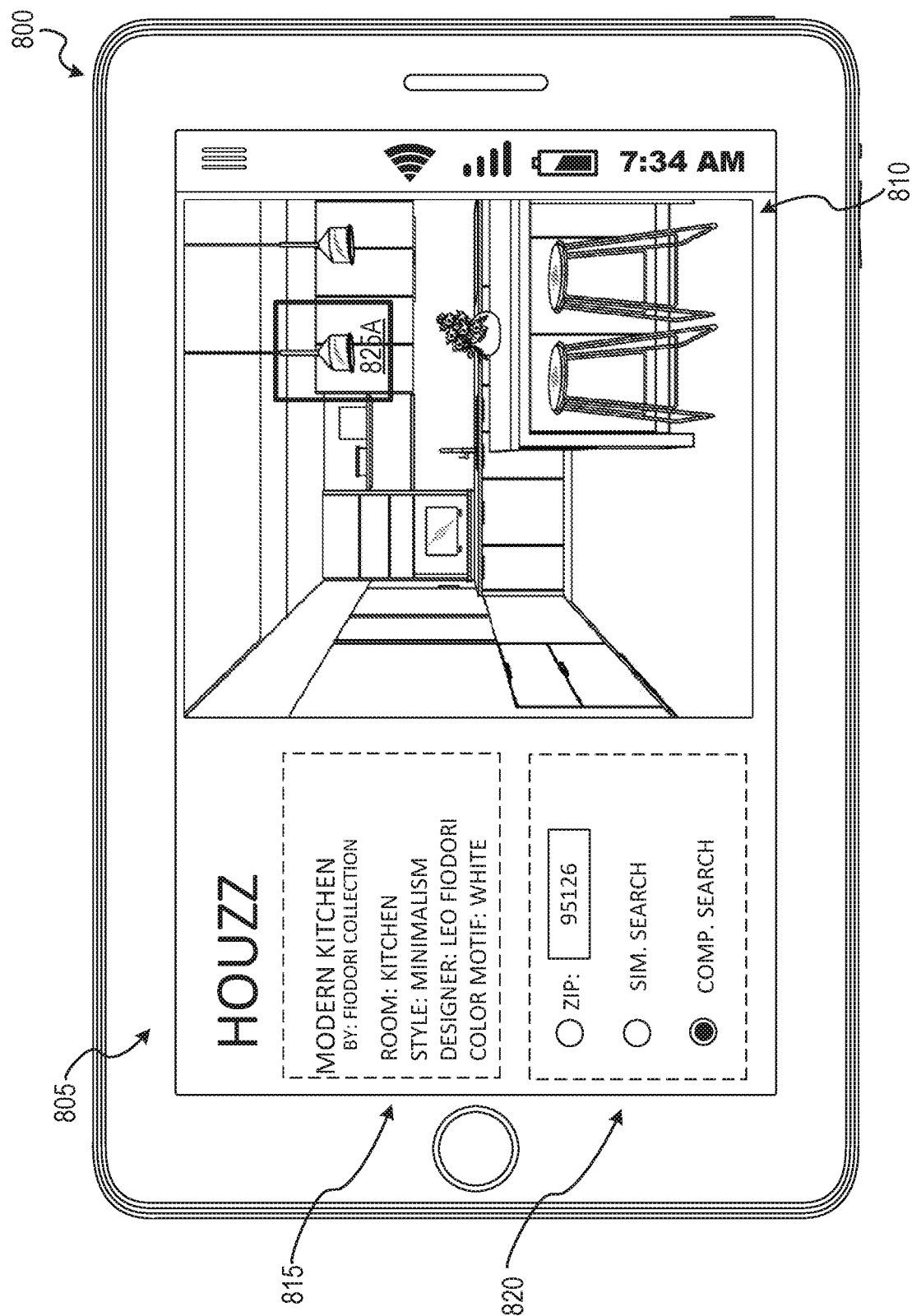

FIGS. 10A and 10B show the example user interface 805 used for performing a complementary item search, as described in FIG. 9A. With reference to FIG. 10A, the user 106 selects the complementary search option from the parameter menu 820. Further, the user 106 selects a region of interest 825A around the hanging lamp item. In response to the selection, the complementary search engine 260 determines which items have similar classification indices to the region of interest 825A. The listing engine 230 generates a listing 1020 that displays complementary items 1000A-D, as illustrated in FIG. 10B. In particular, the complementary item 1000A is a result for a vase that is outside the class of the selected lamp e.g., the vase is a different item type class, but perhaps the same color class); the complementary item 1000B is a result for a chair that is outside the class of the selected lamp (e.g., the chair is a different item type class); the complementary item 1000C is a result for a sink that is outside the class of the selected lamp (e.g., the sink is a different item type class); and the complementary item 1000D is a result for a lamp that is outside the class of the selected lamp (e.g., the lamp of the complementary item 1000D is the same item class but perhaps a different color than the selected lamp).

Figure 11:
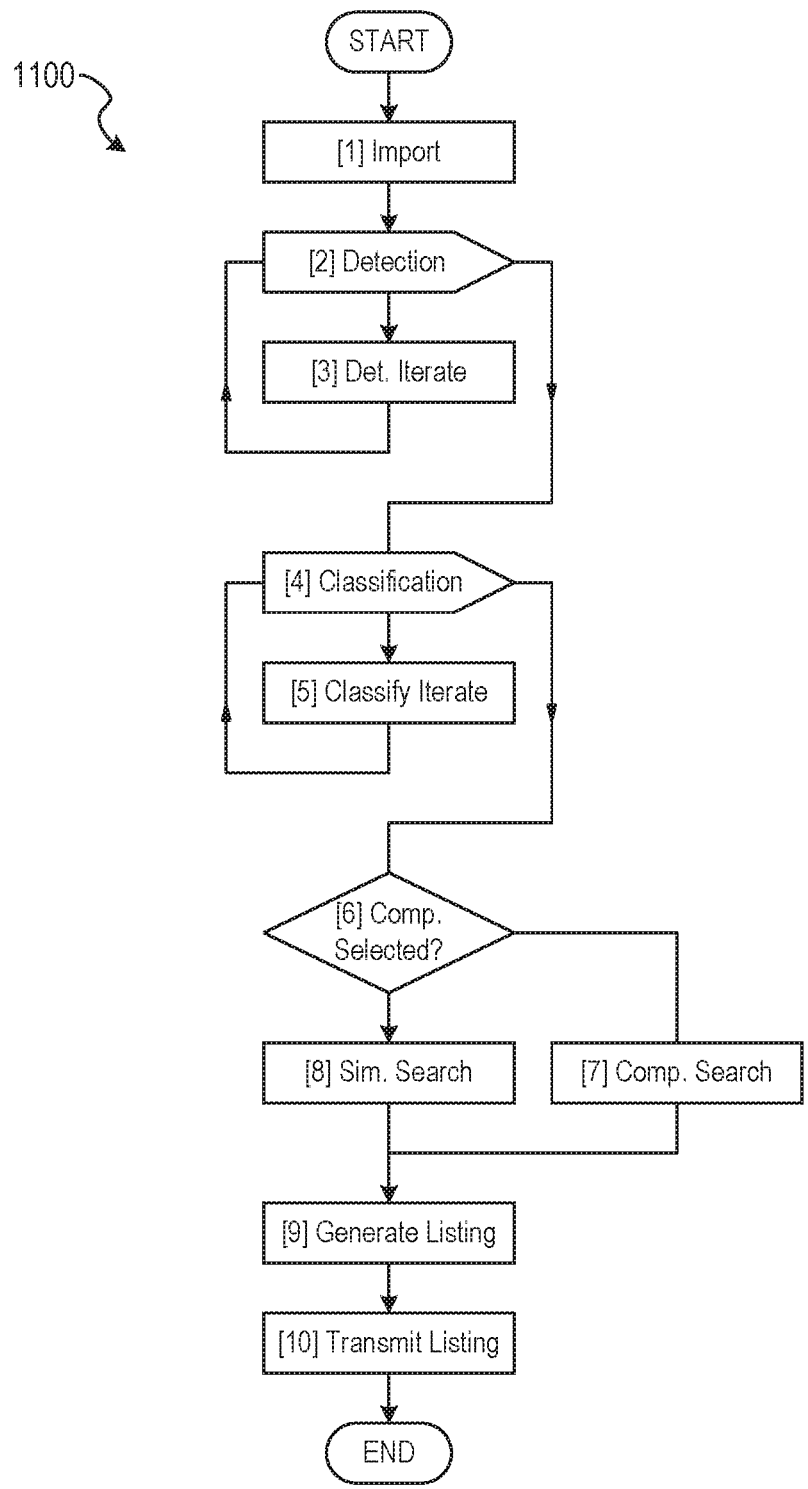
FIG. 11 illustrates a programmatic control flow diagram for implementing similar item search results and complementary item search results using the aesthetic search system, according to some example embodiments.

FIG. 11 shows an example flow diagram 1100 that corresponds to the example code discussed below, according to some example embodiments. Each of the blocks in the flow diagram 1100 is labeled with a bracket number, which corresponds to a position in the below code. For example, at [1] the images (e.g., designer images are input and saved as variables.

:::::::::CODE:::::::::

```
//Aesthetic Search
aesthetic_search.c
//[1] Import ImageSet
images = imagedataset
//[2] Train Detection Model
trainDetector(imagedataset){
    // [3] Feature Detection Loop
    for (i:=0;i<10;i++){
        detectFeatures(image of imagedataset){
            apply detection model for image of imagedataset;
            featureDataset.append(detected features);
        };
    }; //end of FOR [Feature Detection Loop]
    //return featureDataset including data describing detected
features
    return featureDataset;
    //feature detection model trained
};
```

:::::::::CODE:::::::::

```
//[4] Train Classification Model
trainClassifier(featureDataset){
    //[5] Classification Loop
    for (i:=0;i<10;i++){
        classifyFeatures(feature of featureDataset){
            apply classification model to feature to create
            classification_index;
            classificationDataset.append(classification_index);
        };
    }; //end of FOR [Classification Loop]
    //return classificationDataset including classification index for
each feature;
    return featureDataset;
    //feature detection model trained
    };
//Receive user_selection from UI
//[6] Perform type of search based on user selection of type of search
retrieve_listing_images(user_selection){
    // [7] Complementary Search Selected?
    if (TRUE){
        //Perform Sim. Search
        similar_search(user_selection, grouping parameter){
            //identify classification idex for user_selection
            //find items having nearest classification indices
            //find images having the items with nearest indices
            //eliminate images not matching grouping parameter
            //rank images according to gallery saves
            //assign top five gallery saved images as listing images;
            return listing_images;
        };
    }
    else
        //[8] Perform Complementary Search if selected
        comp_search(user_selection, grouping parameter){
            //identify classification index for user_selection
            //determine class of item
            //find items having nearest classification indices
            //find images having the items with nearest indices and
dissimilar class
            //determine top four images
            //assign top five gallery saved images as listing_images
            return listing_images;
        };
    }; //end of IF [Comp. Select?]
};
//[9] Generate Listing
generateListing(listing_images){
    //use listing_images to create user interface listing
    return listing;
    };
//[10] Transmit Listing
void transmit(listing){
    //transmit listing to user
    };
```

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a stand-alone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

Figure 12:
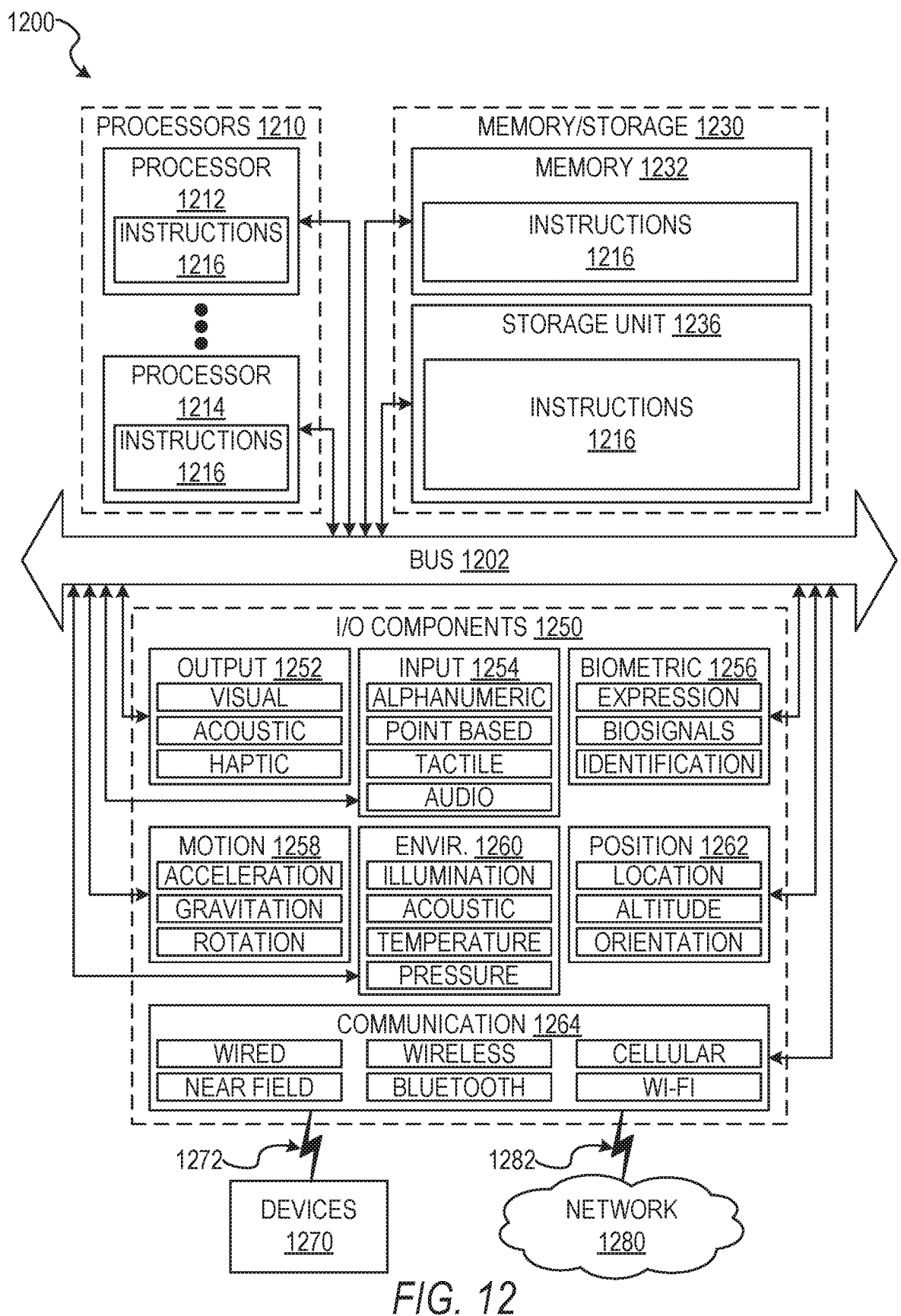
FIG. 12 illustrates a diagrammatic representation of a machine in the form of a computer system within which a set of instructions may be executed for causing the machine to perform any one or more of the methodologies discussed herein, according to an example embodiment.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any one or more of the methodologies discussed herein can be executed. For example, the instructions 1216 can cause the machine 1200 to execute the flow diagrams of FIGS. 3A-7, 9A, 9B, and 11. Additionally, or alternatively, the instructions 1216 can implement the interface engine 210, the detection engine 215, the classification engine 220, the listing engine 230, the user action engine 240, the similarity search engine 250, the complementary search engine 260, and the database engine 265 of FIG. 2, and so forth. The instructions 1216 transform the general, non-programmed machine into a particular machine programmed to carry out the described and illustrated functions in the manner described. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 can include processors 1210, memory/storage 1230, and I/O components 1250, which can be configured to communicate with each other such as via a bus 1202. In an example embodiment, the processors 1210 (e.g., a Central Processing Unit (CPU), a Reduced Instruction. Set Computing (RISC) processor, a Complex Instruction Set Computing (CISC) processor, a Graphics Processing Unit (GPU), a Digital. Signal Processor (DSP), an Application Specific Integrated Circuit (ASIC), a Radio-Frequency Integrated Circuit (RFIC), another processor, or any suitable combination thereof) can include, for example, a processor 1212 and a processor 1214 that may execute the instructions 1216. The term "processor" is intended to include multi-core processors that may comprise two or more independent processors (sometimes referred to as "cores") that can execute instructions contemporaneously. Although FIG. 12 shows multiple processors 1210, the machine 1200 may include a single processor with a single core, a single processor with multiple cores a multi-core processor), multiple processors with a single core, multiple processors with multiples cores, or any combination thereof.

The memory/storage 1230 can include a memory 1232, such as a main memory, or other memory storage, and a storage unit 1236, both accessible to the processors 1210 such as via the bus 1202. The storage unit 1236 and memory 1232 store the instructions 1216 embodying any one or more of the methodologies or functions described herein. The instructions 1216 can also reside, completely or partially, within the memory 1232, within the storage unit 1236, within at least one of the processors 1210 (e.g., within the processor's cache memory), or any suitable combination thereof, during execution thereof by the machine 1200. Accordingly, the memory 1232, the storage unit 1236, and the memory of the processors 1210 are examples of machine-readable media.

As used herein, the term "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions, when executed by one or more processors of the machine (e.g., processors 1210), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1250 can include a wide variety of components to receive input, provide output, produce output, transmit information, exchange information, capture measurements, and so on. The specific I/O components 1250 that are included in a particular machine will depend on the type of machine. For example, portable machines such as mobile phones will likely include a touch input device or other such input mechanisms, while a headless server machine will likely not include such a touch input device. It will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 can include output components 1252 and input components 1254. The output components 1252 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 can include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 1250 can include biometric components 1256, motion components 1258, environmental components 1260, or position components 1262 among a wide array of other components. For example, the biometric components 1256 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 can include acceleration sensor components (e.g., an accelerometer), gravitation sensor components, rotation sensor components (e.g., a gyroscope), and so forth. The environmental components 1260 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or other suitable device to interface with the network 1280. In further examples, the communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, the communication components 1264 can detect identifiers or include components operable to detect identifiers. For example, the communication components 1264 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial. Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geolocation, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a WI-FIR network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or other type of cellular or wireless coupling. In this example, the coupling 1282 can implement any of a variety of types of data transfer technology, such as Single Carrier Radio Transmission Technology (1xRTT), Evolution-Data Optimized (EVDO) technology, General. Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1216 can be transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, the instructions 1216 can be transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving a set of images from a first client device of a designer user of a network site, each image displaying items grouped in the image by the designer user, the items being physical items and the image being a photograph of the physical items as grouped by the designer user;

generating, using a detection neural network, an initial feature dataset for the items by applying an initial detection model of the detection neural network to the set of images;
generating, using a classification neural network, classifications for initial feature data items in the initial feature dataset by applying a classification model of the classification neural network to the initial feature dataset;
merging a portion of the set of images into a visually distinguishable dataset based on images in the portion having similar classifications generated by the classification neural network;
generating an updated detection model by training the detection neural network on the images in the visually distinguishable dataset;
generating, using the detection neural network, feature data for the items by applying the updated detection model to the set of images, the feature data specifying shape attributes of the items displayed in the set of images;
generating using the classification neural network, classification indices for the items by applying the classification model to the feature data;
causing, on a second client device of a non-designer user of the network site, a presentation displaying one of the set of images received from the designer user;
receiving, from the second client device of the non-designer user, a selection of an item in the one of the set of images;
determining a subset of the set of images that display items having classification indices closest to a classification index of the item;
generating a search result that ranks the subset of images according to user action data that describes user bookmarks, by users of the network site, of images in the subset; and
causing a presentation of the search result on a display device of the second client device of the non-designer user.

2. The method of claim 1, wherein the detection neural network and the classification neural network are separate convolutional neural networks.

3. The method of claim 2, further comprising:
receiving, from other client devices of the users of the network site, the user bookmarks of one or more of the images; and
storing the user bookmarks of the one or more images.

4. The method of claim 1, wherein the subset of images are ranked in greatest-to-least order.

5. The method of claim 1, further comprising:
receiving, from the second client device, selection of a grouping parameter, the grouping parameter specifying an attribute of the images; and
wherein each of the images in the search result has an attribute value that is the same as the attribute specified by the grouping parameter.

6. The method of claim 5, wherein the attribute includes one or more of the following: style, designer, color, geographical location.

7. The method of claim 5, wherein the grouping parameter is specified by the non-designer user through a user interface.

8. The method of claim 1, wherein the item is selected from one of the images of the set of images through the display device of the second client device.

9. A system comprising:
one or more processors of a machine; and
a memory storing instructions that, when executed by the one or more processors, cause the machine to perform operations comprising:
receiving a set of images from a first client device of a designer user of a network site, each image displaying items grouped in the image by the designer user, the items being physical items and the image being a photograph of the physical items as grouped by the designer user;
generating, using a detection neural network, an initial feature dataset for the items by applying an initial detection model of the detection neural network to the set of images;
generating, using a classification neural network, classifications for initial feature data items in the initial feature dataset by applying a classification model of the classification neural network to the initial feature dataset;
merging a portion of the set of images into a visually distinguishable dataset based on images in the portion having similar classifications generated by the classification neural network;
generating an updated detection model by training the detection neural network on the images in the visually distinguishable dataset;
generating, using the detection neural network, feature data for the items by applying the updated detection model to the set of images, the feature data specifying shape attributes of the items displayed in the set of images;
generating, using the classification neural network, classification indices for the items by applying the classification model to the feature data;
causing, on a second client device of a non-designer user of the network site, a presentation displaying one of the set of images received from the designer user;
receiving, from the second client device of the non-designer user, a selection of an item in the one of the set of images;
determining a subset of the set of images that display items having classification indices closest to a classification index of the item;
generating a search result that ranks the subset of images according to user action data that describes user bookmarks, by users of the network site, of images in the subset; and
causing a presentation of the search result on a display device of the second client device of the non-designer user.

10. The system of claim 9, wherein the detection neural network and the classification neural network are separate convolutional neural networks.

11. The system of claim 10, the operations further comprising:
receiving, from other client devices of the users of the network site, the user bookmarks of one or more of the images; and
storing the user bookmarks of the one or more images.

12. The system of claim 9, wherein the subset of images are ranked in greatest-to-least order.

13. The system of claim 9, the operations further comprising:
receiving, from the second client device, selection of a grouping parameter, the grouping parameter specifying an attribute of the images; and wherein each of the images in the search result has an attribute value that is the same as the attribute specified by the grouping parameter.

14. The system of claim 13, wherein the attribute includes one or more of the following: style, designer, color, geographical location.

15. The system of claim 13, wherein the grouping parameter is specified by the non-designer user through a user interface.

16. The system of claim 9, wherein the item is selected from one of the images of the set of images through the display device of the second client device.

17. A non-transitory machine-readable storage medium embodying instructions that, when executed by a machine, cause the machine to perform operations comprising:
   receiving a set of images from a first client device of a designer user of a network site, each image displaying items grouped in the image by the designer user, the items being physical items and the image being a photograph of the physical items as grouped by the designer user;
   generating, using a detection neural network, an initial feature dataset for the items by applying an initial detection model of the detection neural network to the set of images;
   generating, using a classification neural network, classifications for initial feature data items in the initial feature dataset by applying a classification model of the classification neural network to the initial feature dataset;
   merging a portion of the set of images into a visually distinguishable dataset based on images in the portion having similar classifications generated by the classification neural network;
   generating an updated detection model by training the detection neural network on the images in the visually distinguishable dataset;
   generating, using the detection neural network, feature data for the items by applying the updated detection model to the set of images, the feature data specifying shape attributes of the items displayed in the set of images;
   generating, using the classification neural network, classification indices for the items b T applying the classification model to the feature data;
   causing, on a second client device of a non-designer user of the network site, a presentation displaying one of the set of images received from the designer user;
   receiving, from the second client device of the non-designer user, a selection of an item in the one of the set of images;
   determining a subset of the set of images that display items having classification indices closest to a classification index of the item;
   generating a search result that ranks the subset of images according to user action data that describes user bookmarks, by users of the network site, of images in the subset; and
   causing a presentation of the search result on a display device of the second Bent device of the non-designer user.

18. The non-transitory machine-readable storage medium of claim 17, wherein the detection neural network and the classification neural network are separate convolutional neural networks.

19. The non-transitory machine-readable storage medium of claim 18, the operations further comprising:
   receiving, from other client devices of the users of the network site, the user bookmarks of one or more of the images; and
   storing the user bookmarks of the one or more images.

20. The non-transitory machine-readable storage medium of claim 17, wherein the subset of images are ranked in greatest-to-least order.

* * * * *